US011920863B2

(12) United States Patent
Uchida et al.

(10) Patent No.: US 11,920,863 B2
(45) Date of Patent: Mar. 5, 2024

(54) NOZZLE, DRYING DEVICE, AND METHOD FOR PRODUCING CAN BODY

(71) Applicant: UNIVERSAL CAN CORPORATION, Tokyo (JP)

(72) Inventors: Hiroaki Uchida, Tokyo (JP); Masamichi Tsuji, Sunto-gun (JP)

(73) Assignee: UNIVERSAL CAN CORPORATION, Tokyo (JP)

( * ) Notice: Subject to any disclaimer, the term of this patent is extended or adjusted under 35 U.S.C. 154(b) by 710 days.

(21) Appl. No.: 17/051,374

(22) PCT Filed: Apr. 26, 2019

(86) PCT No.: PCT/JP2019/018125
§ 371 (c)(1),
(2) Date: Oct. 28, 2020

(87) PCT Pub. No.: WO2019/212058
PCT Pub. Date: Nov. 7, 2019

(65) Prior Publication Data

US 2021/0095923 A1 Apr. 1, 2021

(30) Foreign Application Priority Data

May 1, 2018 (JP) ................................ 2018-088139
May 1, 2018 (JP) ................................ 2018-088140

(51) Int. Cl.
*F26B 21/00* (2006.01)
*B05C 9/14* (2006.01)
*F26B 3/02* (2006.01)

(52) U.S. Cl.
CPC .............. *F26B 21/004* (2013.01); *F26B 3/02* (2013.01); *B05C 9/14* (2013.01)

(58) Field of Classification Search
CPC ............. F26B 21/004; F26B 3/02; B05C 9/14
USPC ............................................................. 34/78
See application file for complete search history.

(56) References Cited

U.S. PATENT DOCUMENTS 2,440,648 A * 4/1948 Walter ..................... D06C 3/00 34/68
3,403,456 A * 10/1968 Smith, Jr. ............... F26B 3/283 34/654
3,570,414 A * 3/1971 Miller .................. B61D 45/001 410/153

(Continued)

FOREIGN PATENT DOCUMENTS

CN 101963439 A 2/2011
CN 202126161 U 1/2012

(Continued)

OTHER PUBLICATIONS

German Office Action dated Nov. 26, 2021 for the corresponding German Patent Application No. 112019002259.8.

(Continued)

*Primary Examiner* — Stephen M Gravini
(74) *Attorney, Agent, or Firm* — Leason Ellis LLP; Melvin C. Garner; Mitsuhiro Haraguchi

(57) ABSTRACT

A nozzle includes a slit-shaped discharge port at tip ends of a pair of nozzle walls arranged to face each other at a predetermined interval and a plurality of protrusions protruding toward the facing nozzle walls at tip end sides of the nozzle walls.

14 Claims, 27 Drawing Sheets

(56) References Cited

U.S. PATENT DOCUMENTS

| | | | | | |
|---|---|---|---|---|---|
| 4,414,757 | A * | 11/1983 | Whipple | F26B 13/104 242/615.11 |
| 4,492,571 | A | 1/1985 | Miura | |
| 4,606,137 | A * | 8/1986 | Whipple | F26B 21/004 34/641 |
| 6,151,798 | A * | 11/2000 | Petersen | B01D 1/18 34/304 |
| 6,702,101 | B2 * | 3/2004 | Haruch | B08B 5/023 15/309.2 |
| 7,254,902 | B2 * | 8/2007 | Hayasaka | B41F 23/044 34/620 |
| 2003/0115709 | A1 | 6/2003 | Haruch et al. | |
| 2012/0015102 | A1 | 1/2012 | Nowack | |
| 2021/0095923 | A1 * | 4/2021 | Uchida | F26B 15/18 |

FOREIGN PATENT DOCUMENTS

| | | | | |
|---|---|---|---|---|
| CN | 204100751 U | | 1/2015 | |
| DE | 112019002259 T5 | * | 3/2021 | B05C 9/14 |
| GB | 2588545 A | * | 4/2021 | B05C 9/14 |
| JP | 58-19779 U | | 2/1983 | |
| JP | 63-90723 U | | 6/1988 | |
| JP | 03-95385 A | | 4/1991 | |
| JP | 05-68957 A | | 3/1993 | |
| JP | 05-203356 A | | 8/1993 | |
| JP | 07-18193 U | | 3/1995 | |
| WO | 8501098 A1 | | 3/1985 | |
| WO | 9429657 A1 | | 12/1994 | |
| WO | WO-2019212058 A1 | * | 11/2019 | B05C 9/14 |

OTHER PUBLICATIONS

Chinese Office Action dated Mar. 3, 2022 for the corresponding Chinese Patent Application No. 201980029469.9, 32 pages [English translation attached].

Japanese Office Action dated Mar. 2, 2021 for the corresponding Japanese Patent Application No. 2019-086662.

International Search Report dated Jul. 23, 2019 for the corresponding Japanese Patent Application No. PCT/JP2019/018125.

* cited by examiner x-y PLANE x-z PLANE x-z PLANE x-y PLANE x-y PLANE x-z PLANE

| NOZZLE POSITION | TEMPERATURE | VELOCITY |
|---|---|---|
| 4r/5 |   |  |
| 0 |   |  |

NOZZLE, DRYING DEVICE, AND METHOD FOR PRODUCING CAN BODY

CROSS-REFERENCE TO RELATED PATENT APPLICATIONS

This application is a U.S. National Phase Application under 35 U.S.C. § 371 of International Patent Application No. PCT/JP2019/018125 filed on Apr. 26, 2019 and claims the benefit of priority to Japanese Patent Applications No. 2018-088139 filed on May 1, 2018 and No. 2018-088140 filed May 1, 2018, all of which are incorporated herein by reference in their entirety. The International Application was published in Japanese on Nov. 7, 2019 as International Publication No. WO/2019/212058 under PCT Article 21 (2).

FIELD OF THE INVENTION

The present invention relates to a nozzle, a drying device, and a method for producing a can body.

BACKGROUND OF THE INVENTION

An inside bake oven (hereinafter referred to as an IBO) for drying a can body having a bottomed cylindrical shape is a tunnel-type oven in which a certain amount of can bodies are collectively conveyed by a conveyor net made of resin or stainless steel and are heat treated. A type of an oven that performs heating in divided three areas (106, 108, 110), for example, like an IBO 100 shown in FIG. 28 is in the mainstream. Can bodies 104 in which a thermosetting resin coating material is coated on inner surfaces of the can bodies by an inside spray machine in a previous process are conveyed to the IBO 100 in a state where upper openings thereof face upward (hereinafter referred to as a normal position).

In the IBO 100, the can bodies 104 normally placed on the conveyor net 102 form a zigzag pattern in plan view, passing through respective areas of a preheating zone 106, a temperature increasing zone 108, a holding zone 110, and a cooling zone 114. In the preheating zone 106, water and solvents are evaporated at approximately 100° C. In the temperature increasing zone 108, the can bodies 104 are made to reach a predetermined temperature. In the holding zone 110, resin is subjected to crosslinking reaction to make a molecular structure dense, thereby forming a coating film satisfying required performance. It is necessary to secure, for example, 190° C.×60 sec for forming the coating film satisfying required performance. The can bodies are conveyed from the holding zone 110 through an air seal 112 and cooled in the cooling zone 114 from the vicinity of 200° C. in can temperature, then, conveyed to a next process.

In respective areas of the IBO 100, nozzle bodies 116 are provided at predetermined positions above the can bodies 104 which are normally placed on the conveyor net 102. Each nozzle body 116 has slit nozzles 117 from which a gas for drying the can bodies 104 is discharged in parallel to a vertical direction of the can bodies 104. The slit nozzle 117 has a slit-shaped discharge port a longitudinal direction of which is a direction orthogonal to a conveying direction of the can bodies 104, namely, a width direction of the conveyor net 102. A plurality of discharge ports each having a predetermined width (for example, 3 to 7 mm) are disposed at fixed intervals (for example, 75 to 90 mm or the like) in the conveying direction. The gas discharged from the slit nozzle 117 has a Reynolds number (hereinafter, "Re number") of approximately 2000 (12 to 16 m/s at the discharge port). When the can bodies 104 are dried as described above, an impinging jet in which the gas discharged from the slit nozzle 117 is blown into the can is adopted in an area where the slit nozzle 117 is arranged, and natural convection heat transfer is adopted in an area where the slit nozzle 117 is not arranged.

In the IBO 100, hot air obtained by absorbing outside air as a gas and heating the gas by a burner is circulated by a circulation fan in a hot-air circulation method though not shown. The hot air is blown out from blow-out nozzles 118 provided above, passing through punching plates 120 just after the blow-out nozzles 118 and punching plates 122 just before the slit nozzles 117 sequentially, thereby being dispersed entirely in respective areas and being equalized in pressure. Accordingly, the hot air with a uniform flow velocity is blown out from the slit nozzles 117.

As the slit nozzle, a vortex flow generator in which a pair of corrugated plates are arranged apart from each other so that their crests and valleys are orthogonal to each other is disclosed in JP-A-3-95385. According to JP-A-3-95385, when air in a turbulent state generated by the vortex flow generator reaches a can body, the flow of air current around the can body is disturbed to thereby dry moisture remaining on the surface of the can body efficiently.

Technical Problem

It has been found that a gas with high rectilinearity can be obtained by vortex generation in JP-A-3-95385; however, a complex mechanism is required to actually generate vortexes. It is difficult to generate a large number of vortexes in a limited space.

The slit nozzles in JP-A-3-95385 are arranged so that the longitudinal direction of the discharge port is orthogonal to the conveying direction; therefore, the impinging jet from the slit nozzles is configured to be blown into the cans intermittently. Since there is an area (time) where heat transfer is performed only by natural convection in a case where an interval of the slit nozzles is larger than an outer diameter of the can, drying efficiency is reduced as compared with a system in which the impinging jet constantly flows in. In a case where the interval of the slit nozzles is smaller than the outer diameter of the can, there exists an area in which two impinging jets flow in, which may make the flow inside the cans unstable and increase energy consumption and initial equipment costs.

A first object of the present invention is to provide a nozzle and a drying device capable of improving the rectilinearity of the gas to be discharged.

A second object of the present invention is to provide a method for producing a can body capable of improving quality of a coating film formed on an inner surface of the can body.

A third object of the present invention is to provide a drying device capable of drying the inside of the can body efficiently.

SUMMARY OF THE INVENTION

Solution to Problem

A nozzle according to the present invention includes a slit-shaped discharge port at tip ends of a pair of nozzle walls arranged to face each other at a predetermined interval and a plurality of protrusions protruding toward the facing nozzle walls at tip end sides of the nozzle walls.

In the nozzle according to the present invention, it is preferable that a Reynolds number of a gas discharged from the discharge port is 1000 to 10000, and a ratio of an area of the protrusion to an area of a gap between the protrusions is 1:3 to 2:1.

In the nozzle according to the present invention, it is preferable that the Reynolds number of the gas discharged from the discharge port is 1000 to 4000.

In the nozzle according to the present invention, it is preferable that the protrusions have a rectangular shape when seen from a discharge direction.

In the nozzle according to the present invention, it is preferable that the protrusions have a triangular shape when seen from the discharge direction.

A drying device according to the present invention includes a plurality of areas with different drying temperatures and a conveying unit conveying can bodies formed in a bottomed cylindrical shape to the plural areas, in which each of plural areas includes the above nozzle.

In the drying device according the present invention, it is preferable that at least one of a shape of a protrusion and a ratio of an area of the protrusion to an area of a gap between the protrusions differs in the plural areas.

In the drying device according the present invention, it is preferable that, in the plural areas, a preheating zone, a temperature increasing zone, and a holding zone are sequentially provided along a conveying direction from an upstream side, that the protrusions in the preheating zone have a rectangular shape when seen from a discharge direction and the ratio of the area of the protrusion to the area of the gap between the protrusions is 1:2, and that the protrusions in the temperature increasing zone and the holding zone have a triangular shape when seen from the discharge direction and the ratio of the area of the protrusion to the area of the gap between the protrusions is 1:3.

In the drying device according the present invention, it is preferable that a width length of the discharge port is shorter than a radius of the can body.

A method of producing a can body according to the present invention includes the steps of conveying bottomed-cylindrical shaped can bodies in which a coating film made of a thermosetting resin coating material is formed on inner surfaces to a plurality of areas with different drying temperatures and baking the coating film on the inner surfaces, in which, in the step of baking the coating film, a gas is discharged from a nozzle including a slit-shaped discharge port at tip ends of a pair of nozzle walls arranged to face each other at a predetermined interval and a plurality of protrusions protruding toward the facing nozzle walls at tip end sides of the pair of nozzle walls.

A drying device according to the present invention includes a conveying unit conveying can bodies formed in a bottomed cylindrical shape and a nozzle including a slit-shaped discharge port from which a gas is discharged toward upper openings of the can bodies, in which a longitudinal direction of the discharge port is parallel to a conveying direction.

In the drying device according to the present invention, the discharge port may be arranged at a position displaced from a center of the can body in a width direction of the conveying unit.

In the drying device according the present invention, it is preferable that, when a distance between a center in a width direction of the discharge port and the center of the can body is "D", and a radius of the can body is "r", the discharge port is arranged within a range of $(r/3) \leq D < r$.

In the drying device according the present invention, it is preferable that a suction port from which the gas is sucked is provided on an opposite side of a side where the discharge port is arranged across the center of the can body.

In the drying device according to the present invention, it is preferable that the conveying unit has an alignment mechanism aligning the can bodies in a line in the conveying direction.

In the drying device according to the present invention, it is preferable that the nozzle includes a pair of nozzle walls arranged to face each other at a predetermined interval, a discharge port at tip ends of the nozzle walls and a plurality of protrusions protruding toward the facing nozzle walls at tip end sides of the nozzle walls.

Advantageous Effects of Invention

According to the present invention, hot air with improved rectilinearity can be discharged from the nozzle. The hot air discharged from the nozzle travels straight in one direction and easily enters the inside of the can body. Therefore, the drying device can dry the inside of the can efficiently. Since the inside of the can is capable of being dried efficiently, it is possible to further improve the quality of the coating film formed on the inner surface of the can body by using the method for producing the can body according to the present invention.

The longitudinal direction of the discharge port is arranged in parallel to the conveying direction according to the present invention, and the upper opening of the can body is continuously exposed to hot air; therefore, it is possible to dry the inside of the can efficiently.

BRIEF DESCRIPTION OF THE DRAWINGS

FIG. 3A to FIG. 3C are plan views of the nozzle, in which FIG. 3A is a view showing a nozzle of a first example, FIG. 3B is a view showing a nozzle of a second example, and FIG. 3C is a view showing a nozzle of a third example.

FIG. 5A and FIG. 5B are views showing modification examples of the nozzle, in which FIG. 5A is a view showing a modification example (1) and FIG. 5B is a view showing a modification example (2).

FIG. 8A to FIG. 8D are visualized images obtained by imaging a gas passed through the nozzle in the Re number of 1000, in which FIG. 8A is a visualized image on an x-y plane of a comparative example, FIG. 8B is a visualized image on the x-y plane by the nozzle of the third example, FIG. 8C is a visualized image on an x-z plane of the comparative example, and FIG. 8D is a visualized image on the x-z plane of the third example.

FIG. 11A and FIG. 11B are visualized images obtained by imaging a gas passed through the nozzle of the first example in the Re number of 3000, in which FIG. 11A is a visualized image on an x-y plane and FIG. 11B is a visualized image on an x-z plane.

FIG. 13A and FIG. 13B are visualized images obtained by imaging a gas passed through the nozzle of the first example in the Re number of 10000, in which FIG. 13A is a visualized image on an x-y plane and FIG. 13B is a visualized image on an x-z plane.

FIG. 15A to FIG. 15D are visualized images obtained by imaging a gas passed through the nozzle in the Re number of 2000, in which FIG. 15A is a visualized image on an x-y plane of the comparative example, FIG. 15B is a visualized image on the x-y plane by the nozzle of the modification example (2), FIG. 15C is a visualized image on an x-z plane of the comparative example, and FIG. 15D is a visualized image on the x-z plane by the nozzle of the modification example (2).

FIG. 22A to FIG. 22D are visualized images obtained by imaging a gas passed through the nozzle in the second embodiment, in which FIG. 22A is a visualized image obtained when the nozzle is in the vicinity of a left side surface of a can body, FIG. 22B is a visualized image obtained when the nozzle is close to the left in the center of the can body, FIG. 22C is a visualized image obtained when the nozzle is close to the right in the center of the can body, and FIG. 22D is a visualized image obtained when the nozzle is on a right side surface of the can body.

FIG. 23A to FIG. 23D are plan views showing positions between the can body and the nozzle corresponding to respective views of FIG. 22A to FIG. 22D, in which FIG. 23A is a plan view obtained when the nozzle is at a position of D=r on the left side surface, FIG. 23B is a plan view obtained when the nozzle is at a position of D=(r/3) close to the left of the center of the can body, FIG. 23C is a plan view obtained when the nozzle is at a position of D=(r/3) close to the right of the center of the can body, and FIG. 23D is plan view obtained when the nozzle is at a position of D=r on the right side surface of the can body.

DETAILED DESCRIPTION OF THE INVENTION

1. First Embodiment

Figure 1:
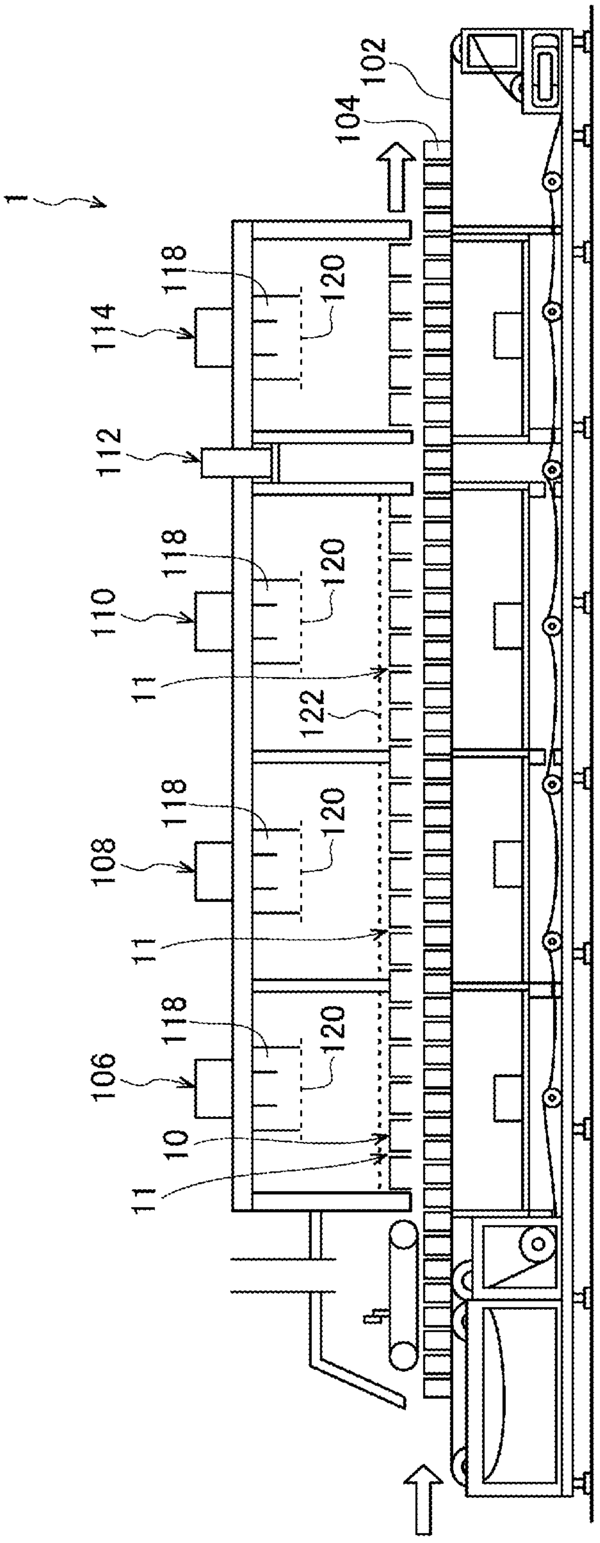
FIG. 1 is a schematic view showing the entire structure of a drying device according to a first embodiment.

Hereinafter, embodiments of the present invention will be explained in detail with reference to the drawings. A drying device according to the embodiment is used in a coating process in a method for producing a can body. Hereinafter, an outline of the method for producing the can body will be explained.

A can produced in the method for producing the can body is formed by molding, for example, an aluminum plate of 0.20 mm to 0.50 mm, which is used for a can body of a two-piece can or a bottle can in which the contents such as beverages are filled and sealed. In the embodiment, the can body used for the two-piece can will be explained as an example.

The can bodies are manufactured by going through punching and cupping processes, a DI process, a trimming process, a washing process, a printing process, a coating process, a necking process, and a flanging process.

In the punching process and the cupping process (drawing process), drawing processing (cupping process) is performed to a thin plate made of an aluminum alloy material while punching the thin plate by a cupping press, thereby forming a shallow cup-shaped body having a relatively large diameter.

In the DI process (drawing and ironing process), DI processing (drawing and ironing processing) is performed to the cup-shaped body by a DI processing apparatus to mold the cup-shaped body into a bottomed-cylindrical can body having a can barrel and a can bottom. The can bottom of the can body is molded into a can bottom shape of the can body in a final form by the above DI processing.

In the trimming process, trimming processing is performed to an opening end part of the can body. The opening end part of the can body formed by the DI processing apparatus is not uniform in height due to ears formed there. The opening end part is cut and trimmed, thereby making heights in a peripheral wall along an axial direction of the can uniform over the entire circumference in the opening end part.

In the washing process, the can body is washed to remove lubricating oil and so on, then, the can body is subjected to surface treatment and is dried.

In the printing process, external printing and external coating are performed. The external printing is performed to the can barrel by using printing ink. Then, the external coating is performed just after the external printing.

In the coating processing, a coating film is formed on inner surfaces of the can barrel and the can bottom of the can body. For example, the coating film is formed on the inner surfaces by using a thermosetting resin coating material (for example, an epoxy-based coating material), and the can body in which the coating film is formed is heated and dried by the drying device according to the embodiment to bake the coating film on the inner surfaces.

In the necking process, a neck part having a smooth inclined shape is formed at the opening end part by necking processing using a necking mold (diameter-reducing mold). Specifically, the necking mold (a necking die and a guide block) is fitted to the inside and the outside of the can barrel, and diameter reducing processing is performed to the opening end part so as to reduce the diameter toward an upper direction between the necking die and the guide block to thereby form the neck part. A flange prearranged part having a cylindrical shape is molded at an upper portion of the neck part by the diameter reducing processing.

In the flanging process, the flange prearranged part is subjected to flanging processing to mold an annular flange part protruding from an upper end of the neck part toward an outer side in a radial direction and extending along a circumferential direction.

The can bodies are manufactured as described above and conveyed to a post process of the flanging process. In the post processing, the contents such as beverages are filled inside the can bodies, can lids are seamed to the flange parts and the can bodies are sealed.

A drying device 1 according to the embodiment will be explained with reference to FIG. 1. The drying device 1 for drying can bodies 104 with the bottomed cylindrical shape is a tunnel-type oven in which a certain amount of can bodies 104 are collectively conveyed by a conveyor net 102 made of resin or stainless steel and are heat-treated. The drying device 1 performs heating in divided three areas. The can bodies 104 in which a thermosetting resin coating material is coated on inner surfaces of the can bodies by an inside spray machine in a previous process are conveyed to the drying device 1 in a state of being normally placed in which upper openings 105 face upward.

In the drying device 1, a temperature increasing zone 108, a holding zone 110, and a cooling zone 114 are sequentially provided along a conveying direction from an upstream side. Then, a preheating zone 106 is provided before the temperature increasing zone 108 according to need. The can bodies 104 normally positioned on the conveyor net 102 as a conveying unit are arranged in a lattice shape in plan view, passing through respective areas of the preheating zone 106, the temperature increasing zone 108, the holding zone 110, and the cooling zone 114. In the preheating zone 106, water and solvents are evaporated at approximately 100° C. In the temperature increasing zone 108, the can bodies 104 are made to reach a predetermined temperature. In the holding zone 110, resin is subjected to crosslinking reaction to make a molecular structure dense, thereby forming a coating film satisfying required performance. It is necessary to secure, for example, 190° C.×60 sec for forming the coating film satisfying required performance. The can bodies are conveyed from the holding zone 110 through an air seal 112 and cooled in the cooling zone 114 from the vicinity of a can temperature 200° C., then, conveyed to a next process.

In respective areas of the drying device 1, nozzle bodies 10 are provided at predetermined positions respectively above the can bodies 104 which are normally placed on the conveyor net 102. Each nozzle body 10 has nozzles 11 discharging a gas in parallel to a vertical direction of the can bodies 104. In the specification, the parallel is not limited to a completely parallel state but includes a slightly inclined state from the completely parallel state.

In the drying device 1, hot air obtained by absorbing outside air as a gas for drying the can bodies 104 and heating the gas by a burner to approximately 100° C. to 255° C. is circulated by a circulation fan in a hot-air circulation method though not shown. The hot air is blown out from blow-out nozzles 118 provided above, passing through punching plates 120 just after the blow-out nozzles 118 and punching plates 122 just before the nozzles 11 sequentially, thereby being dispersed entirely in respective areas and being equalized in pressure. Accordingly, the hot air with a uniform flow velocity is blown out from the nozzles 11. A basic structure of the drying device 1 is not limited to an example shown in FIG. 1, but can be applied to other examples using a so-called impinging jet.

Figure 2:
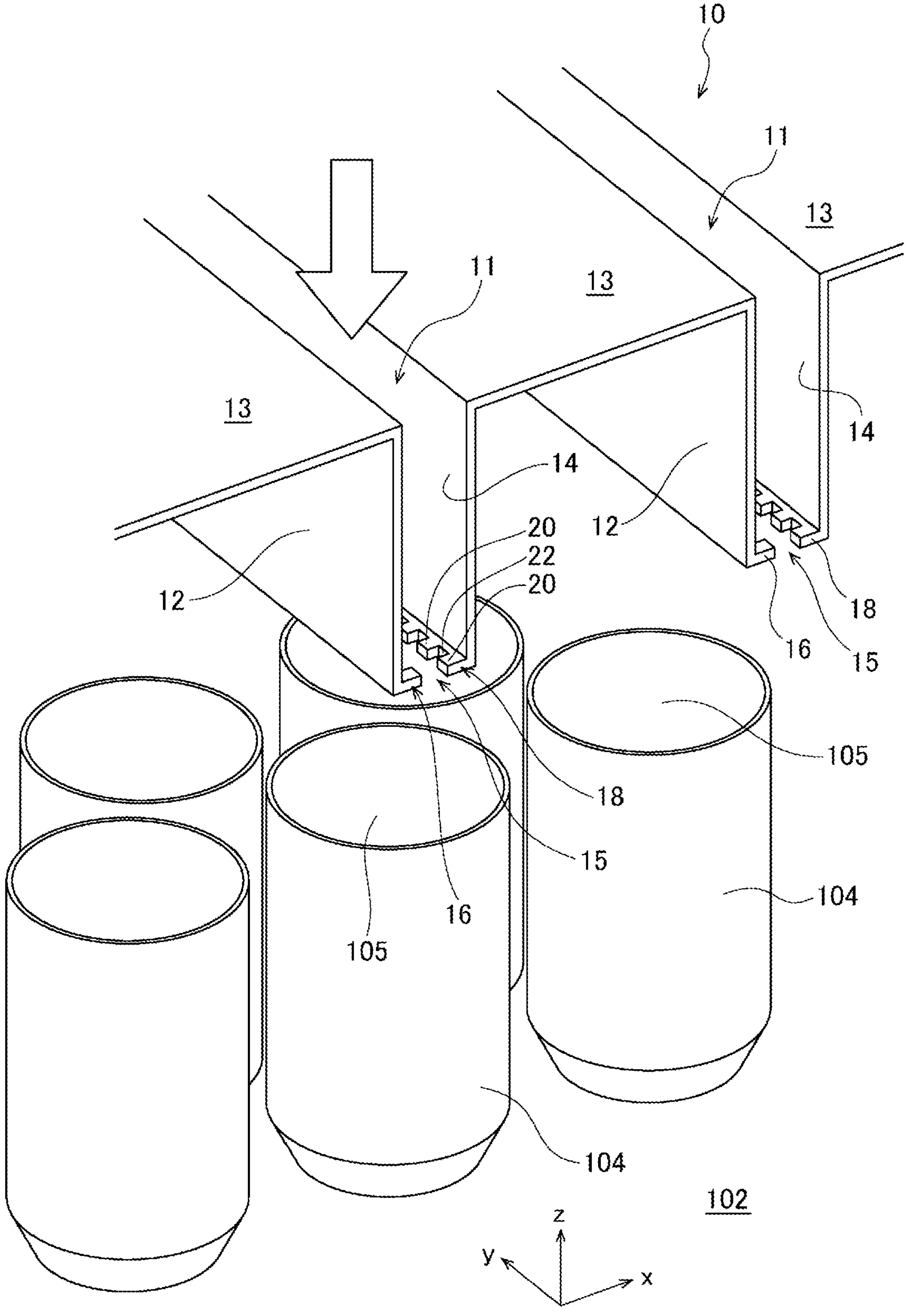
FIG. 2 is a perspective view of a nozzle used for the drying device according to the first embodiment.

As shown in FIG. 2, the nozzle body 10 is provided with nozzles 11 at predetermined intervals. Each nozzle 11 has a pair of nozzle walls 12, 14 arranged to face each other at a predetermined interval (for example, 3 to 7 mm). In FIG. 2, the conveying direction corresponds to an x-direction, a width direction of the conveyor net 102 as the conveying unit corresponds to a y-direction, and a direction perpendicular to the surface of the conveyor net corresponds to a z-direction.

The nozzle 11 has a flow path for introducing hot air passing through the punching plate 122 (FIG. 1) to one direction. The flow path has a slit shape formed between the nozzle walls 12, 14. One direction is a discharge direction of hot air. In the case of FIG. 2, one direction is an arrow direction (z-direction) in the drawing, which is the direction parallel to a central axis of the normally-placed can body 104 with the bottomed-cylindrical shape. A length of the nozzle 11 in one direction can be selected appropriately.

In the embodiment, the nozzle walls 12, 14 are formed by a pair of flat plates arranged at a predetermined interval. The respective nozzle walls 12, 14 are integrated to top boards 13 at base ends. In the nozzle body 10, the nozzles 11 are formed with the top boards 13 interposed therebetween. A base end of the nozzle 11 forms an entrance of hot air after passing through the punching plate 122.

A discharge port 15 as an exit of hot air from which hot air is discharged toward the upper openings 105 of the can bodies 104 is provided at an end of the nozzle 11. The discharge port 15 has a slit-shaped opening. The nozzles 11 are arranged so that a longitudinal direction of the discharge ports 15 is a direction orthogonal to the conveying direction, namely, arranged in parallel to the width direction of the conveyor net 102. A flow path connecting the entrance of the nozzle 11 and the discharge port 15 has a flat shape when seen from one direction. The area of an opening of the flow path is preferably constant until just before the discharge port 15. In the case of FIG. 2, the flow path and the discharge port 15 seen from one direction have a rectangular shape. A drying gas discharged from the nozzle 11 has a predetermined "Re number" which is, for example, approximately 2000 (12 to 16 m/s at the discharge port). As described above, the so-called impinging jet in which the hot air discharged from the nozzle 11 is blown into the can body 104 is adopted in drying of cans.

Tip end sides of the nozzle walls 12, 14, which are, tip ends 16, 18 in the case of FIG. 2 have a plurality of protrusions 20 protruding toward the facing nozzle walls 12, 14. The plural protrusions 20 have a comb-teeth shape, which are formed along the longitudinal direction of the discharge port 15. The protrusion 20 shown in FIG. 2 has a rectangular shape when seen from one direction. Recesses 22 are formed between respective protrusions 20. The recesses 22 have a rectangular shape like the protrusions 20.

Although the protrusions 20 and the recesses 22 formed in the nozzle wall 12 are formed at the same positions as the protrusions 20 and the recesses 22 formed in the nozzle wall 14 in the case of FIG. 2, the present invention is not limited to this. For example, the protrusions 20 and the recesses 22 formed in the nozzle wall 12 may be displaced with respect to the protrusions 20 and the recesses 22 formed in the nozzle wall 14 in the longitudinal direction of the discharge port 15, or the recesses 22 of the nozzle walls 14 may be formed at positions corresponding to the protrusions 20 formed in the nozzle wall 12.

Although the protrusions 20 formed in the nozzle wall 12 are perpendicular to the nozzle wall 12, the present invention is not limited to this. The protrusions 20 may be inclined to an exit side of the discharge port 15 and may be inclined to an entry side of the discharge port 15.

The size and intervals of the protrusions 20 may be selected according to a Reynolds number (hereinafter, "Re number") of hot air. When the Re number is 1000 to 10000, a ratio of an area of the protrusion 20 to an area of a gap (recess 22) between the protrusions 20 is preferably in a range from 1:3 to 2:1. When the ratio of the area of the protrusion 20 to the area of the gap (recess 22) between the protrusions 20 is within the above range in the case where the Re number is 1000 to 10000, rectilinearity of hot air passing the discharge port 15 can be improved.

It is further preferable that the Re number of hot air is 1000 to 4000 because the flow velocity of hot air is low and there is no danger that the can body 104 is knocked over.

Figure 3A:
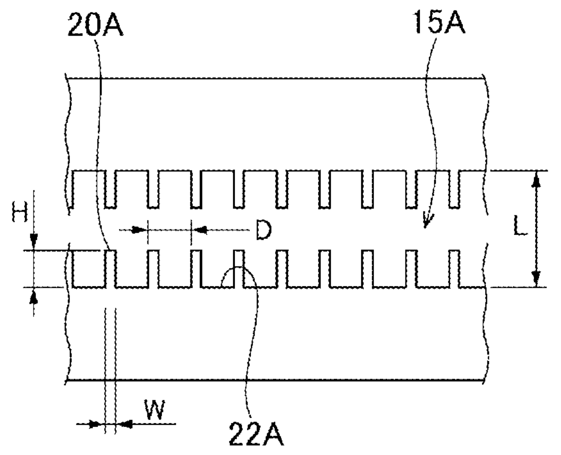
Figure 3B:
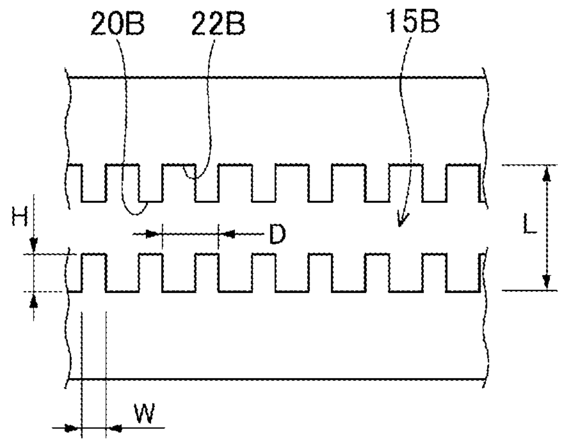
Figure 3C:
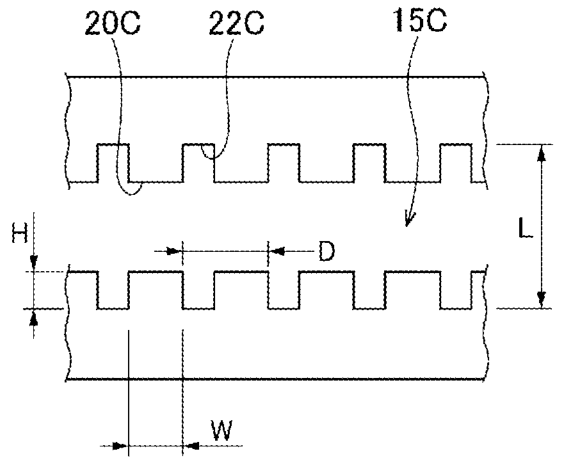

A discharge port 15A of a nozzle shown in FIG. 3A is an example (first example) in which a ratio of the area of a protrusion 20A to the area of a recess 22A between the protrusions 20A is 1:3. A discharge port 15B of a nozzle shown in FIG. 3B is an example (second example) in which a ratio of the area of a protrusion 20B to the area of a recess 22B between the protrusions 20B is 1:1. A discharge port 15C of a nozzle shown in FIG. 3C is an example (third example) in which a ratio of the area of a protrusion 20C to a recess 22C between the protrusions 20C is 2:1. A width length L of the discharge port 15 is shorter than a radius of the can body 104.

The flow velocity of hot air discharged from the discharge port 15 is gradually reduced. A length of a region where the flow velocity of the discharge port is maintained is called a potential core length XP. The potential core lengths XP of the discharge ports 15A, 15B of the nozzles of the first example and the second example are longer than that of the third example when the Re number is in a range from 1000 to 2000. The potential core length XP of the discharge port 15A is longer than those of the second example and the third example when the Re number is in a range from 3000 to 10000.

Figure 4:
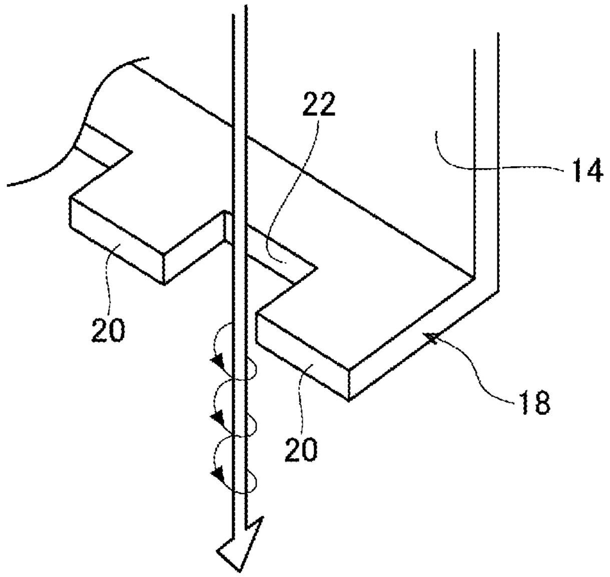
FIG. 4 is a perspective view for explaining the operation of the nozzle.

Hot air passing through the above nozzle 11 passes the recess 22 between the protrusions 20 and becomes a vertical vortex having an axis of one direction as shown in FIG. 4, thereby increasing rectilinearity. The drying device 1 including the nozzles 11 can discharge hot air with improved rectilinearity from the discharge ports 15. The hot air discharged from the discharge port 15 makes a curtain shape extending in the width direction of the conveyor net 102. The hot air travels straight in one direction and easily enters the can bodies 104 conveyed on the conveyor net 102. Therefore, the drying device 1 can dry inner surfaces of the can bodies 104 efficiently. That is, the drying device 1 can suppress the energy consumption.

Figure 28:
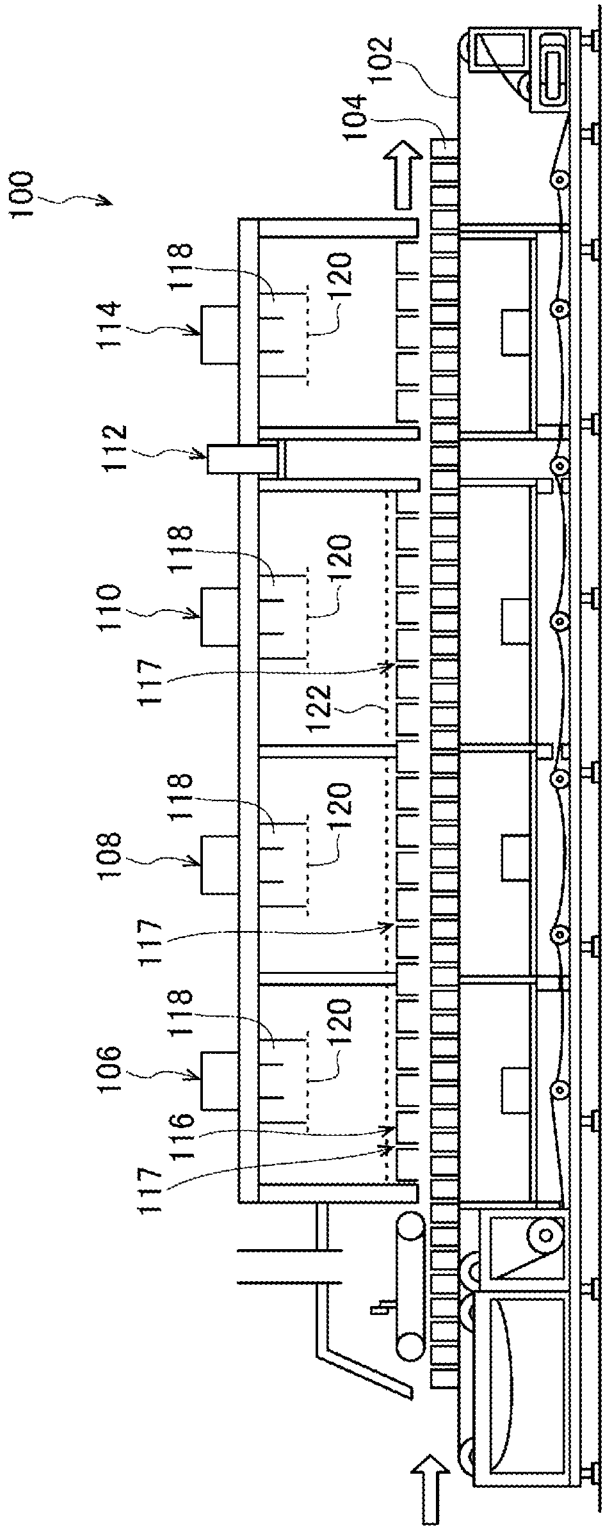
FIG. 28 is a schematic view showing the entire structure of a related-art drying device.

Since the related-art nozzle body 116 (FIG. 28) does not have protrusions, hot air becomes a horizontal vortex having an axis parallel to the longitudinal direction of the discharge port, and the hot air tends to spread in a short-side direction of the discharge port.

In the case where the Re number is 1000 to 10000, the area of the protrusion 20 with respect to the area of the recess 22 is appropriately selected, thereby generating vertical vortexes in hot air more efficiently and improving rectilinearity of hot air. The Re number can be changed according to the temperature of hot air to be discharged. Therefore, it is effective for drying inner surfaces of the can bodies 104 efficiently to appropriately select the area of the protrusion 20 with respect to the area of the recess 22 in each area in the drying device 1 having plural areas with different drying temperatures.

In a case where the Re number is larger in a range from 1000 to 3000, the area of the protrusion 20 with respect to the area of the recess 22 is preferably smaller as reduction in flow velocity is gradual. On the other hand, in a case where the Re number is smaller in the above range, the area of the protrusion 20 with respect to the area of the recess 22 is preferably larger as reduction in flow velocity is gradual.

When the Re number is 1000 or more, the amount of hot air is large and drying efficiency is good. When the Re number is 10000 or less, a preferable flow velocity can be obtained from a viewpoint of preventing the can bodies 104 from being knocked over.

Figure 5A:
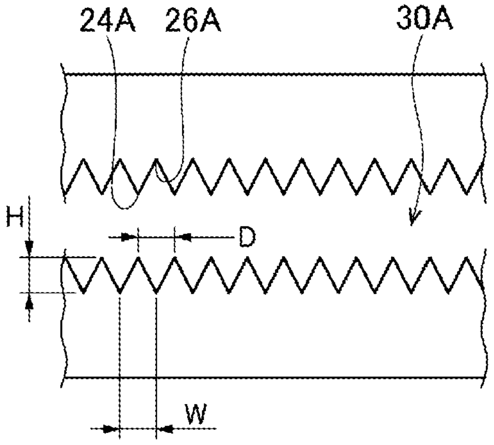
Figure 5B:
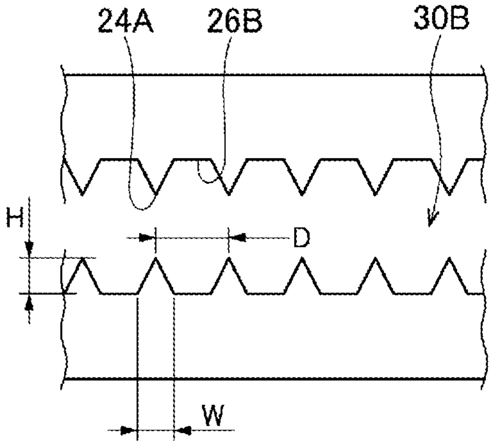

The case where the protrusions 20 have the rectangular shape has been explained in the above embodiment; however, the present invention is not limited to this. The protrusions 20 may have a triangular shape as shown in FIG. 5A and FIG. 5B. It is preferable that a ratio of an area of a triangular protrusion to an area of a recess is within a range from 1:1 to 1:3 as good rectilinearity of hot air can be obtained as compared with the case where the related-art nozzle not having protrusions is used. A discharge port 30A of a nozzle shown in FIG. 5A is an example of 1:1 (modification example (1)). A recess 26A of the discharge port 30A has a triangular shape that is the same as a protrusion 24A. A discharge port 30B of a nozzle shown in FIG. 5B is an example (modification example (2)) in which the above ratio is 1:3. A recess 26B of the discharge port 30B has a trapezoidal shape. The nozzle can generate vertical vortexes in hot air passing through the gap between protrusions also when the protrusions have the triangular shape; therefore, the same effects as the above embodiment can be obtained.

The case where the nozzle 11 is arranged so that the longitudinal direction of the discharge port 15 is in parallel to the width direction of the conveyor net 102 has been explained in the above embodiment; however, the present invention is not limited to this. It is also possible that the nozzle 11 is arranged so that the longitudinal direction of the discharge port 15 is in parallel to the conveying direction, that is, in parallel to the longitudinal direction of the conveyor not 102, which is a position deviated from the center of the can body 104 in the width direction of the conveyor net 102. When the nozzle 11 is arranged as described above, hot air can be continuously supplied into the can body from the upper opening 105 of the can body 104, and the supplied hot air reaches the bottom part along the inner surface of the can body efficiently. Therefore, the can body 104 is entirely heated by contact with hot air and is dried efficiently. Since a heat transfer coefficient is high particularly when the can body 104 is made of aluminum, the can body can be dried more efficiently.

The case where the plural protrusions 20 are provided at the tip ends 16, 18 of the nozzle walls 12, 14 has been explained in the above embodiment; however, the present invention is not limited to this. The protrusions 20 may be formed at positions displaced in an entrance direction of the discharge port 15 to the extent that the rectilinearity of hot air is not significantly reduced due to pressure loss.

EXAMPLE 1

Results obtained by actually verifying rectilinearity of hot air in the nozzle body 10 according to the embodiment will be explained below. First, nozzles of the first example (FIG. 3A, rectangular tab A, H: 2 mm, W: 0.75 mm, D: 2.25 mm), the second example (FIG. 3B, rectangular tab B, H: 2 mm, W: 1.5 mm, D: 3.0 mm), the third example (FIG. 3C, rectangular tab C, H: 2 mm, W: 3.0 mm, D: 4.5 mm), and the modification example (2) (FIG. 5B, triangular tab B, H: 2 mm, W: 2 mm, D: 4 mm) were prepared. The length in the longitudinal direction of the discharge ports was set to 300 mm. As a comparative example, a slit nozzle (without tab) not having protrusions was prepared. A height of protrusions is denoted by H, a width of protrusions is denoted by W, and an arrangement pitch of protrusions is denoted by D. A length in a short-side direction of the discharge port (nozzle height) in the comparative example was used as a nozzle height (an equivalent nozzle height He) to be a reference, and the nozzle heights were adjusted so that flow velocities were fixed in respective examples. The equivalent nozzle height He was set to 5 mm in the embodiment. A gas with a predetermined Re number was supplied from the blow-out nozzle to the entrance of the nozzle through the punching plate. The working fluid was air in room temperature. The Re number of the working fluid was adjusted by changing the flow velocity of the fluid in a range from 3 to 30 m/s.

Figure 6:
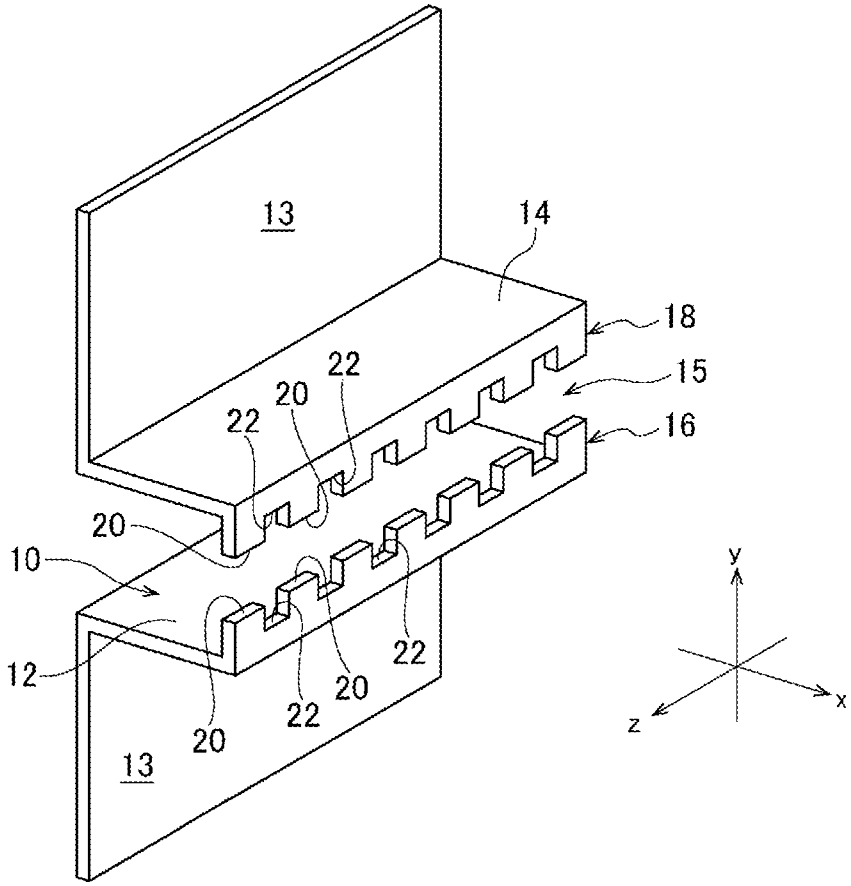
FIG. 6 is a view for explaining experimental data.

A velocity distribution of the discharged gas was measured by particle image velocimetry. Specifically, flows of air discharged from the nozzle on an x-y plane and an x-z plane shown in FIG. 6 were imaged by using a CCD camera. The oil mist (average particle diameter 1 μm, specific gravity s≈1.05) was used as a tracer, and an Nd:YAG laser (the maximum output 200 mJ) was used as a light source. The results are shown in FIG. 7 to FIGS. 15A to 15D.

Figure 7:
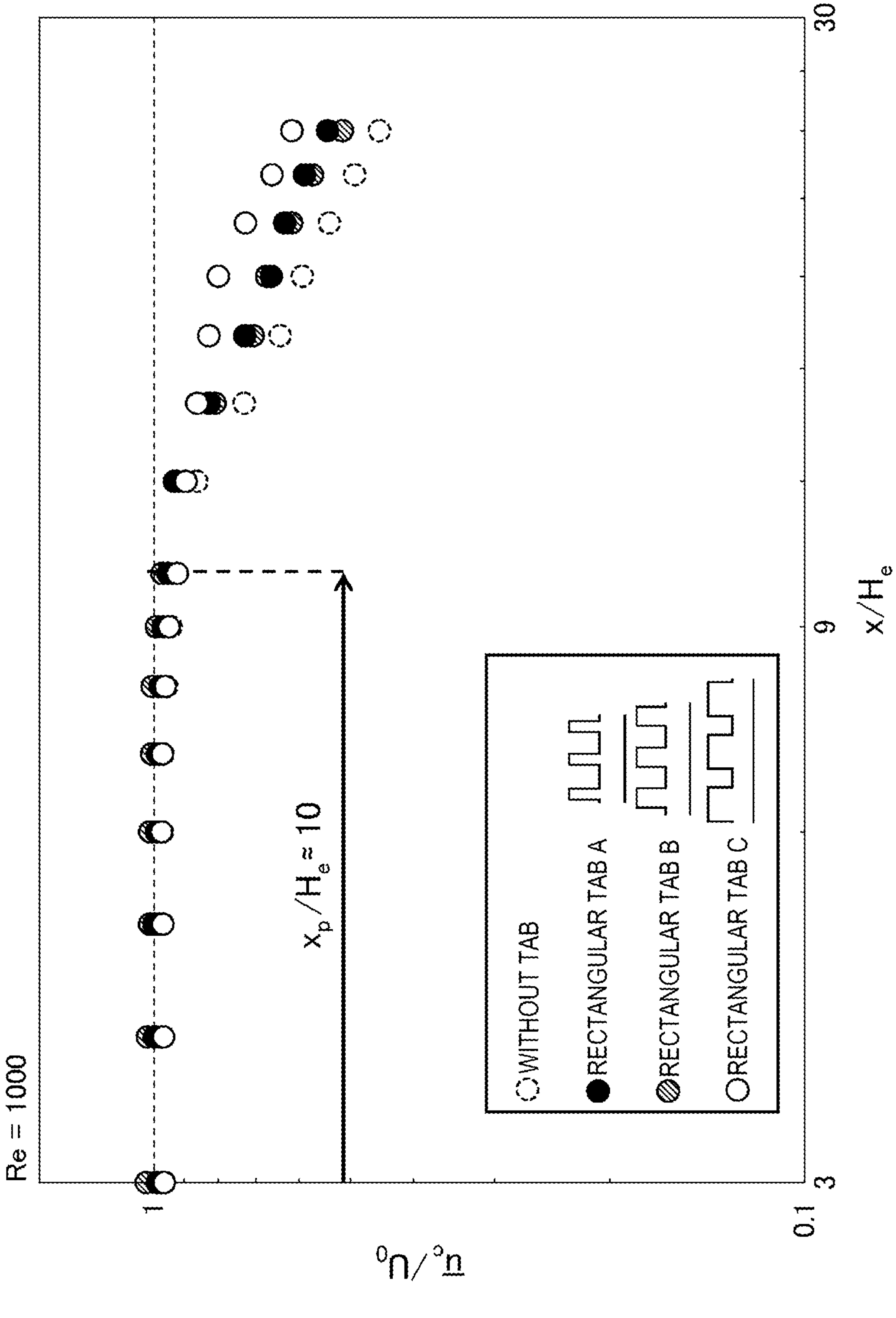
FIG. 7 is a graph showing results obtained by measuring a velocity distribution in a Re number of 1000.
Figure 8A:
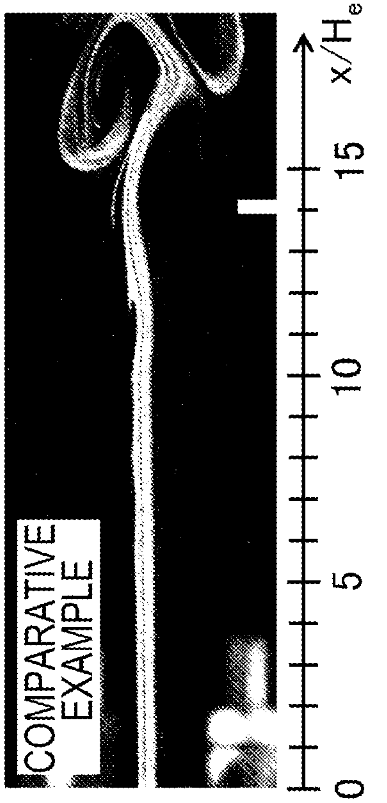
Figure 8B:
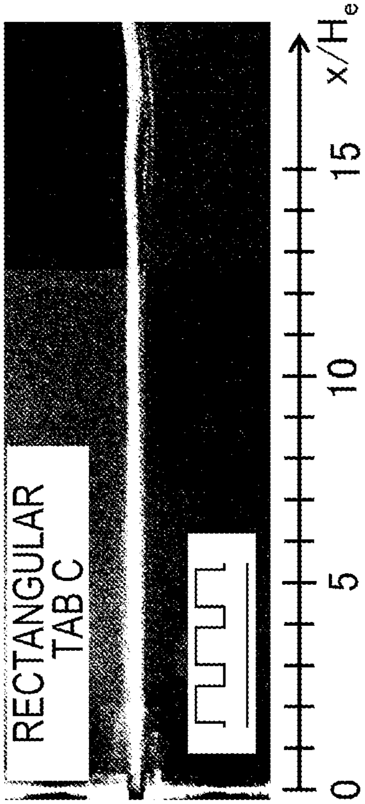
Figure 8C:
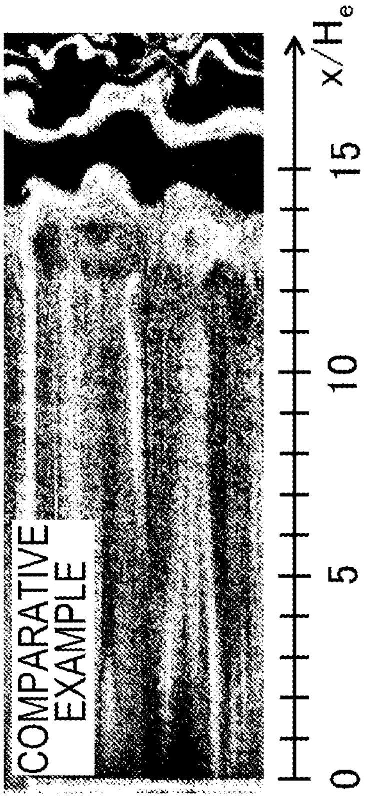
Figure 8D:
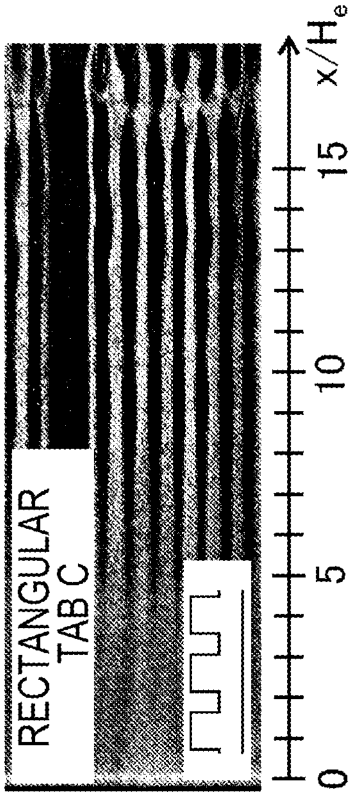

FIG. 7 and FIGS. 8A to 8D show results obtained in the case where the Re number is 1000. In FIG. 7, a horizontal axis represents the ratio (x/He) of a distance x from the discharge port to the equivalent nozzle height He and a vertical axis represents the ratio wind velocity (uc/U0) when a flow velocity at the discharge port is U0, and a flow velocity in x/He is uc. The potential core length XP was set as a region where 95% of the flow velocity at the discharge port was maintained in this example. The potential core lengths XP of the nozzles in the first example and the second example were the longest, which were approximately 10. It was confirmed that the reduction in flow velocity was smaller in all nozzles in the first to third examples as compared with the nozzle of the comparative example and that the reduction in flow velocity was the smallest in the nozzle of the third example (rectangular tab C) among them. It was also confirmed, from visualized images shown in FIGS. 8A to 8D, that vertical vortexes were generated, not horizontal vortexes, and rectilinearity was improved in the third example (rectangular tab C) as a striped pattern could be seen even at a point where x/He was 15. The result matches the result in flow velocity in FIG. 7. On the other hand, a large horizontal vortex was generated at the point where x/He was 15 in the comparative example (without tab). It can be considered that generation of the horizontal vortex caused the reduction in flow velocity.

Figure 9:
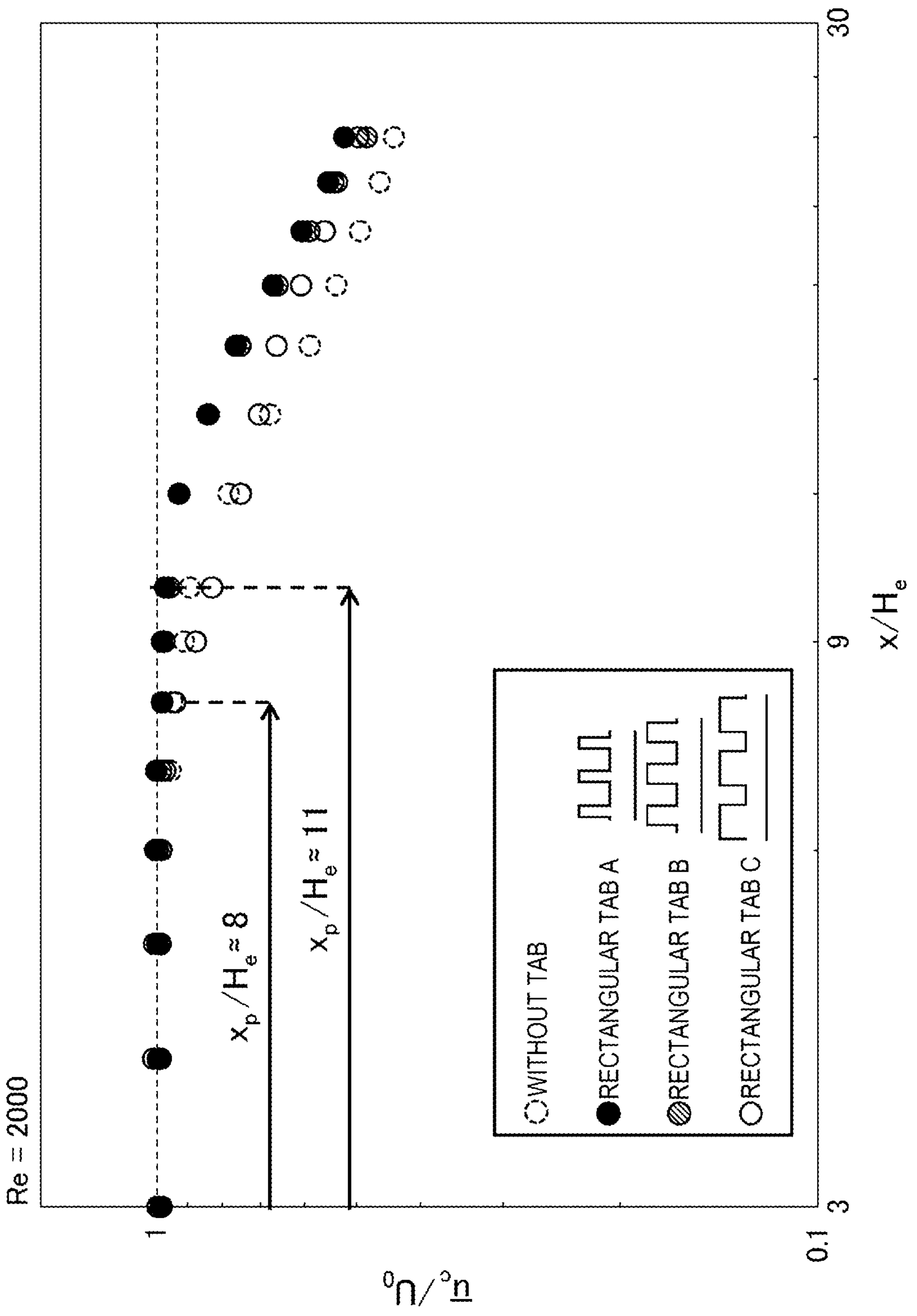
FIG. 9 is a graph showing results obtained by measuring a velocity distribution in a Re number of 2000.

FIG. 9 shows results obtained in the case where the Re number is 2000. The horizontal axis and the vertical axis of FIG. 9 are the same as those of FIG. 7. The potential core lengths XP of the nozzles in the first example and the second example were the longest, which were approximately 11. On the other hand, the potential core length XP in the comparative example was approximately 8. It was confirmed that the reduction in flow velocity was smaller in all nozzles in the first to third examples as compared with the nozzle of the comparative example and that the reduction in flow velocity was further smaller in the nozzles of the first and second examples (rectangular tabs A, B) among them. The reduction in flow velocity was large in the comparative example (without tab) as compared with the first to third examples also in the case where the Re number was 2000.

Figure 10:
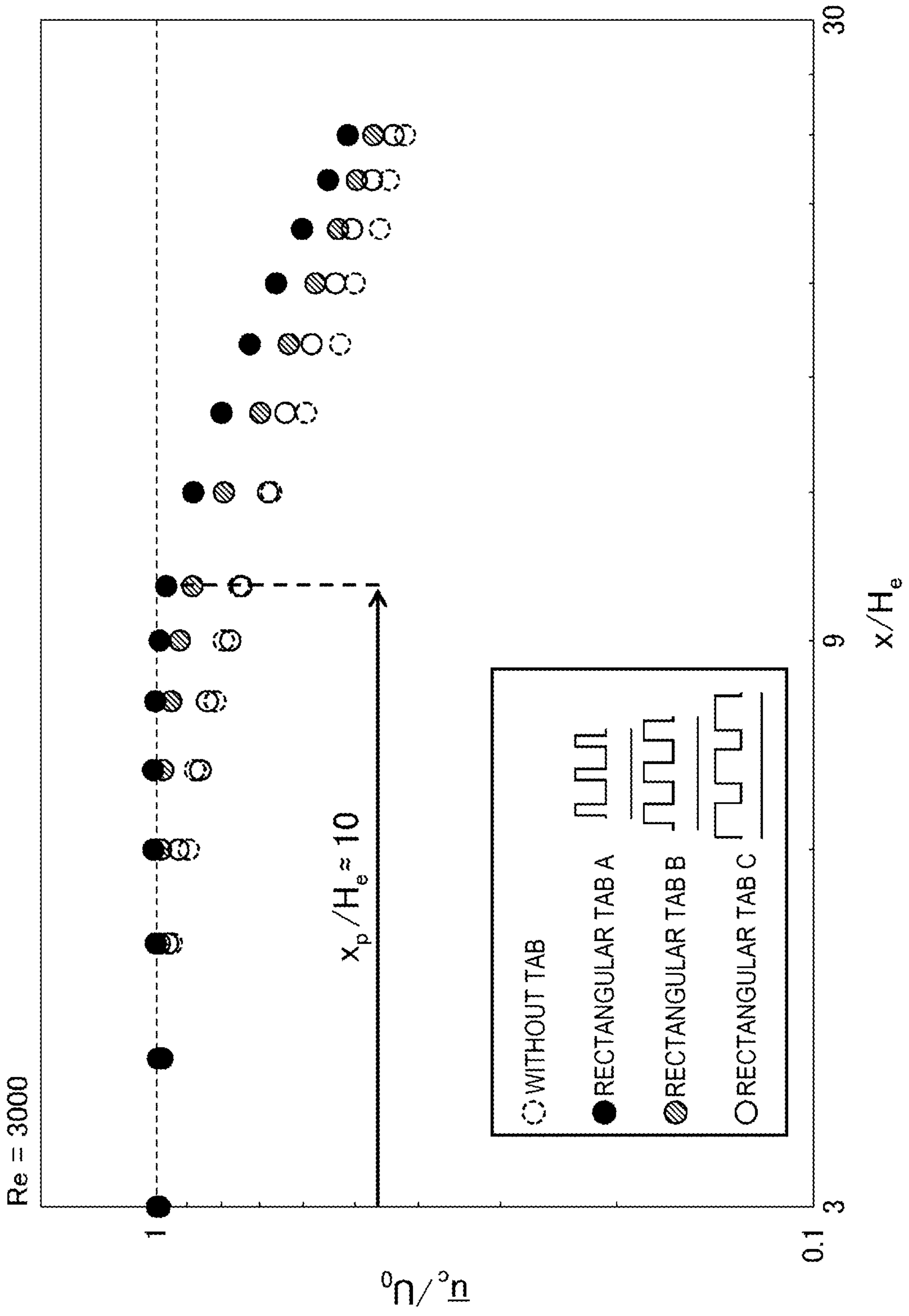
FIG. 10 is a graph showing results obtained by measuring a velocity distribution in a Re number of 3000.
Figure 11B:
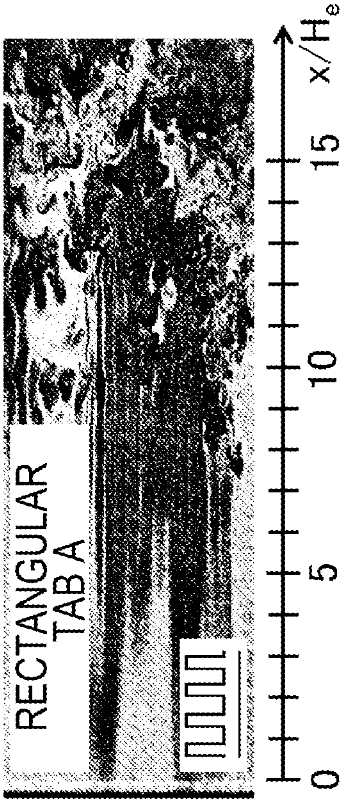
Figure 11A:
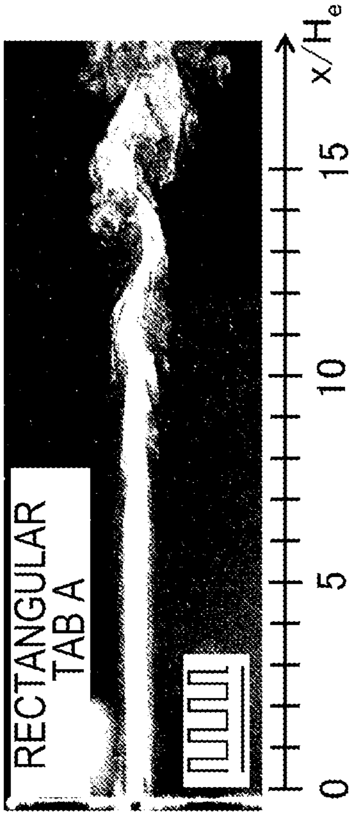

FIG. 10 and FIGS. 11A, 11B show results obtained in the case where the Re number is 3000. The horizontal axis and the vertical axis of FIG. 10 are the same as those of FIG. 7. The potential core length XP of the nozzle in the first example was the longest, which was approximately 10. It was confirmed that the reduction in flow velocity was smaller in all nozzles in the first to third examples as compared with the nozzle in the comparative example and that the reduction in flow velocity was the smallest in the nozzle of the first example (rectangular tab A) among them. It was also confirmed, from visualized images shown in FIGS. 11A, 11B, that a horizontal vortex was not generated in the first example (rectangular tab A) even at a point where x/He was 10 and rectilinearity was improved. The result matches the result in flow velocity in FIG. 10.

Figure 12:
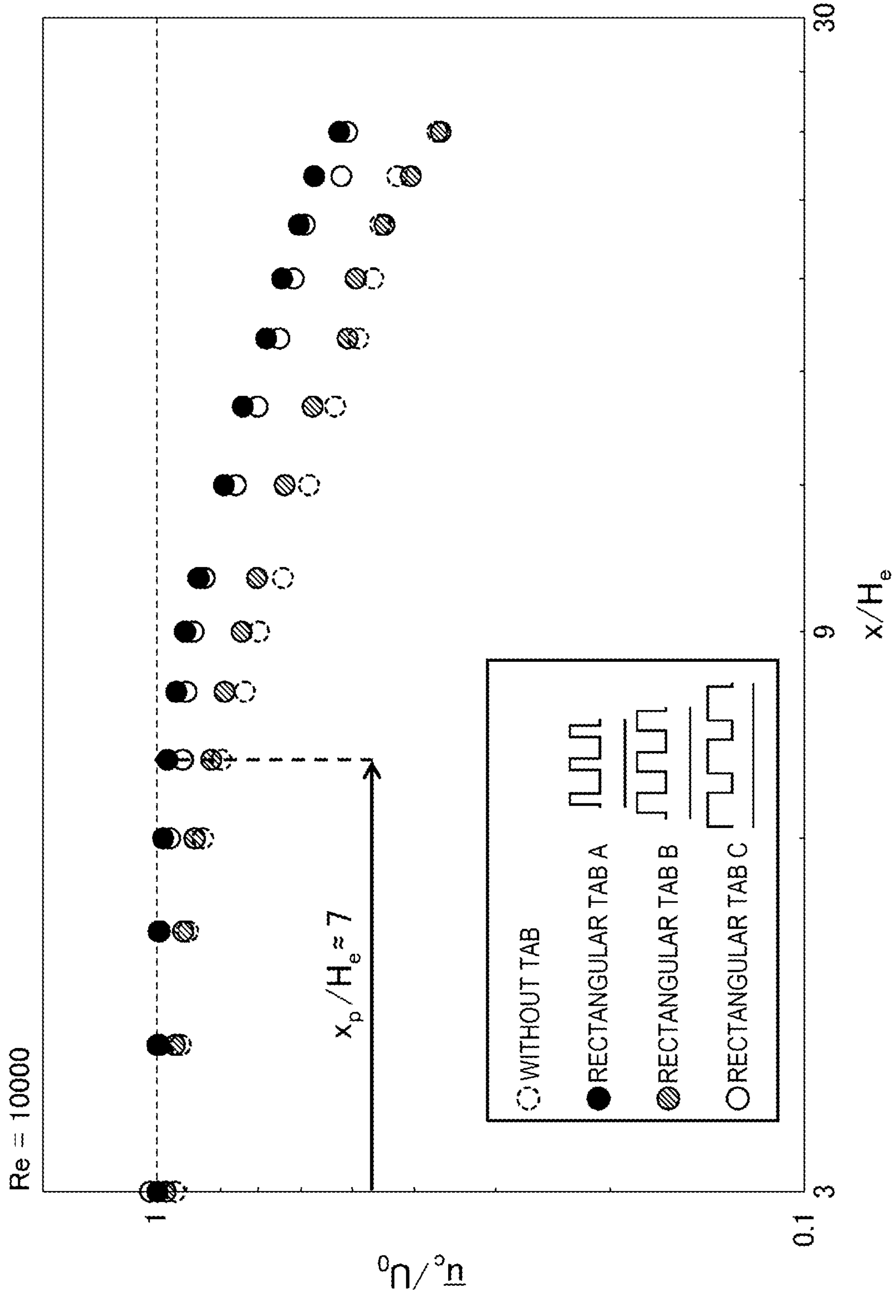
FIG. 12 is a graph showing results obtained by measuring a velocity distribution in a Re number of 10000.
Figure 13B:
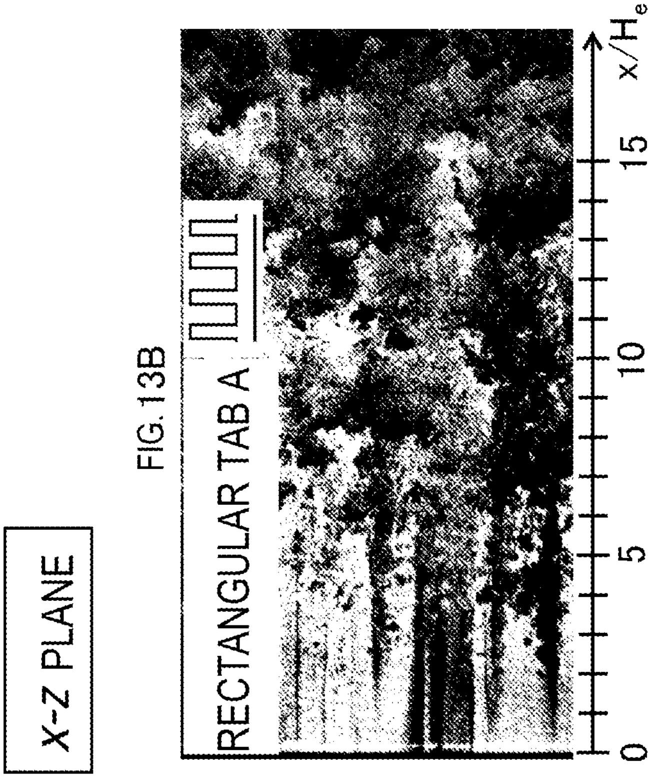
Figure 13A:
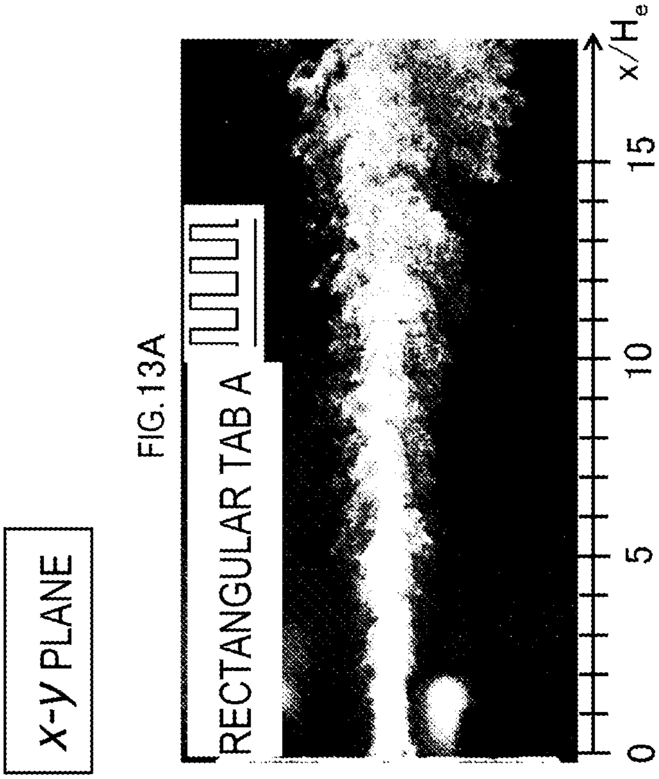

FIG. 12 and FIGS. 13A, 13B show results obtained in the case where the Re number is 10000. The horizontal axis and the vertical axis of FIG. 12 are the same as those of FIG. 7. The potential core length XP of the nozzle in the first example was the longest, which was approximately 7. On the other hand, the potential core length XP of the comparative example was approximately 3. It was confirmed, from FIG. 12, that all nozzles in the first to third examples have superiority in flow velocity over the nozzle in the comparative example and that the reduction in flow velocity was the smallest in the nozzle of the first example (rectangular tab A) among them. It was also confirmed, from visualized images shown in FIGS. 13A, 13B, that a horizontal vortex was not generated in the first example (rectangular tab A) even at a point where x/He was 4. The result matches the result in flow velocity in FIG. 12.

Figure 14:
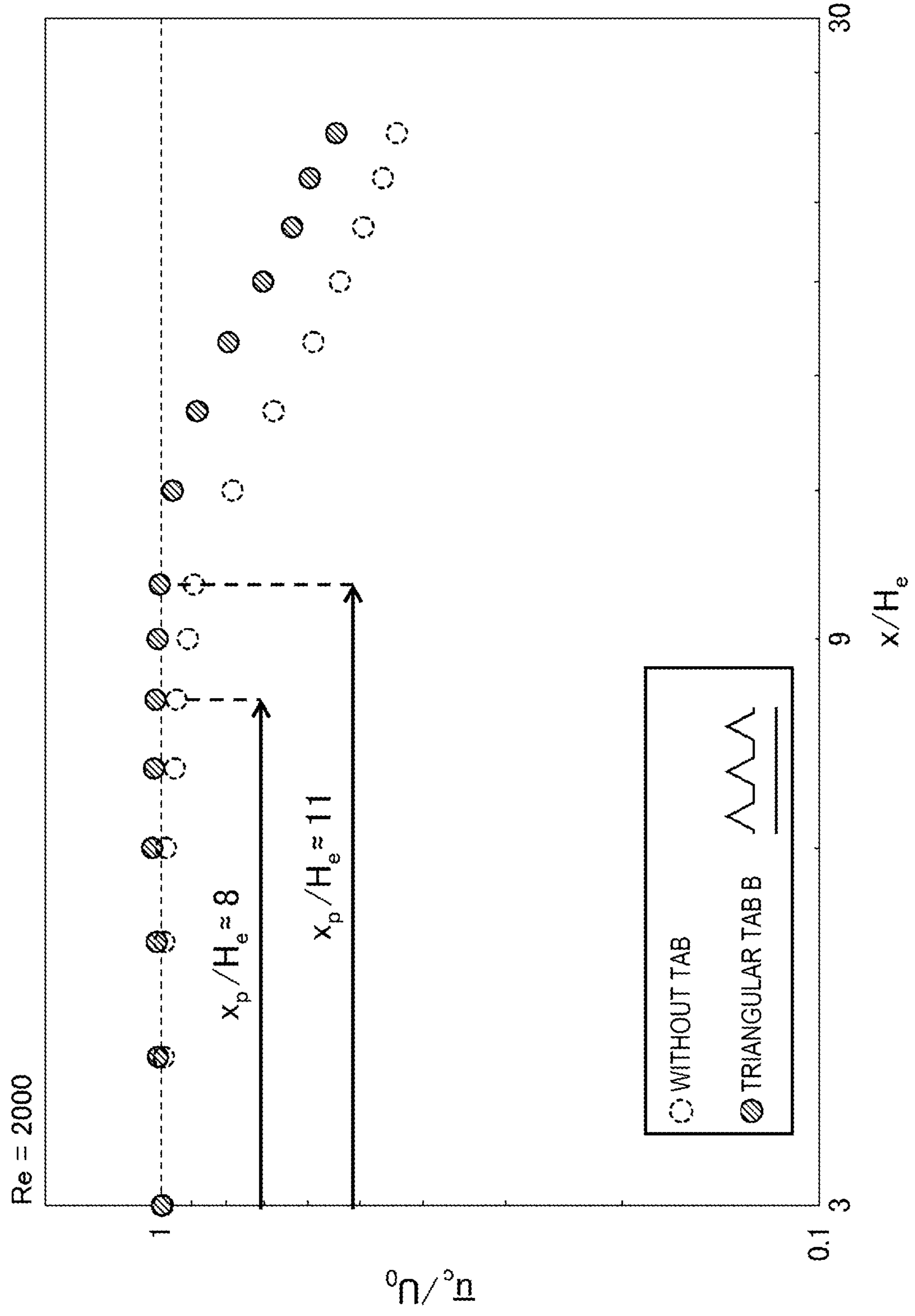
FIG. 14 is a graph showing results obtained by measuring a velocity distribution by the nozzle of a modification example (2) in the Re number of 2000.
Figure 15A:
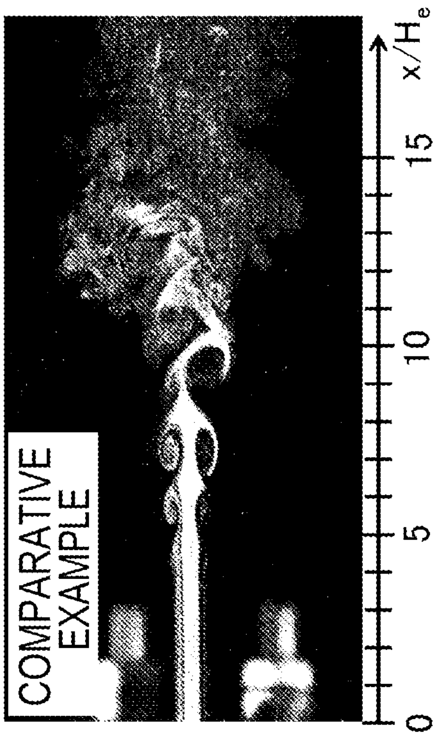
Figure 15B:
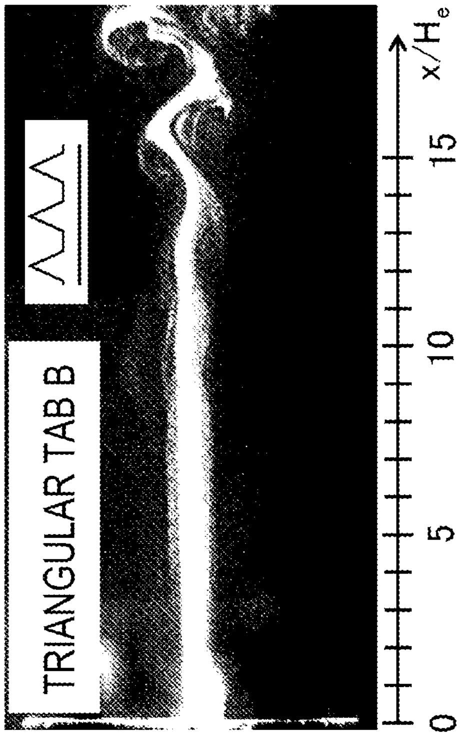
Figure 15C:
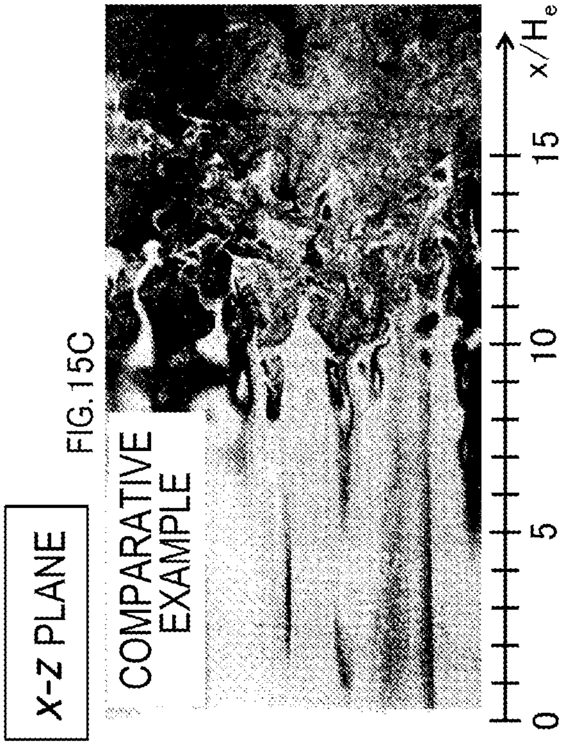
Figure 15D:
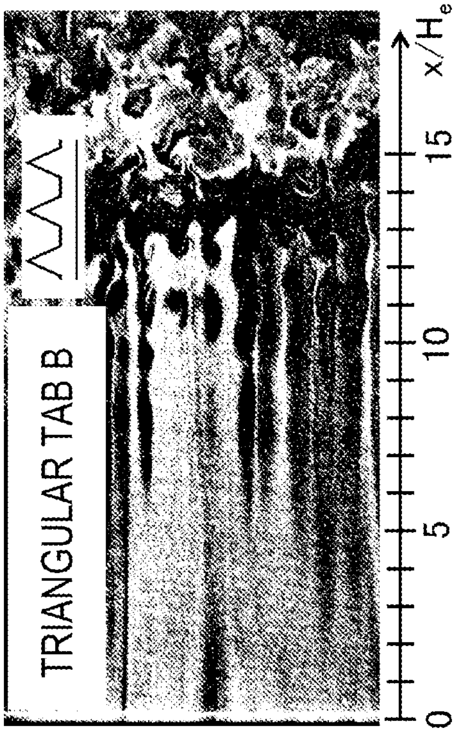

FIG. 14 and FIGS. 15A to 15D show results obtained in the case where the Re number is 2000 in the modification example (2) (triangular tab B). The horizontal axis and the vertical axis of FIG. 14 are the same as those of FIG. 7. The potential core length XP of the nozzle in the modification example (2) was approximately 11. On the other hand, the potential core length XP in the comparative example was approximately 8. It was confirmed that the reduction in flow velocity was smaller in the nozzle of the modification example (2) as compared with the nozzle of the comparative example. It was also confirmed, from visualized images shown in FIGS. 15A to 15D, that a horizontal vortex was not generated in the modification example (2) even at a point where x/He was 11 and rectilinearity was improved. The result matches the result in flow velocity in FIG. 14. On the other hand, a horizontal vortex has been already generated in the comparative example (without tab) at a point where x/He was 5.

As the result of above verification, it has been confirmed, when the protrusion has the rectangular shape, in the range from the Re number 1000 to 10000, that the potential core length XP becomes the largest in the nozzle of the first example, namely, the discharge port having the ratio of the area of the recess 22A between the protrusions 20A is 1:2. In the case of triangular protrusions, it has been found that the longer potential core length XP can be obtained when the Re number is 2000.

According to the above, it has been found that rectilinearity of the gas discharged from the discharge port can be improved by using the nozzles according to the present invention. Since the drying device using the nozzle can send hot air into the can bodies easily, the can bodies can be dried more efficiently.

Specifically, in the case where the Re number is 2000 (the temperature increasing zone 108 and the holding zone 110), it is preferable to use the nozzle of the modification example (2), that is, the nozzle having the discharge port 30B (FIG. 5B) in which the protrusions 24A have the triangular shape when seen from the discharge direction and the ratio of the area of the protrusion 24A to the area of the recess 26B is 1:3. In the case where the Re number is 3000 (the preheating zone 106), it is preferable to use the nozzle of the first example, namely, the nozzle having the discharge port 15A (FIG. 3A) in which the protrusions 20A have the rectangular shape when seen from the discharge direction, and the ratio of the area of the protrusion 20A to the area of the recess 22A is 1:2. The shape of protrusions and the ratio of the area of the protrusion to the area of the recess are appropriately selected according to the Re number as described above, thereby obtaining the drying device capable of drying the can bodies more efficiently.

2. Second Embodiment

Figure 16:
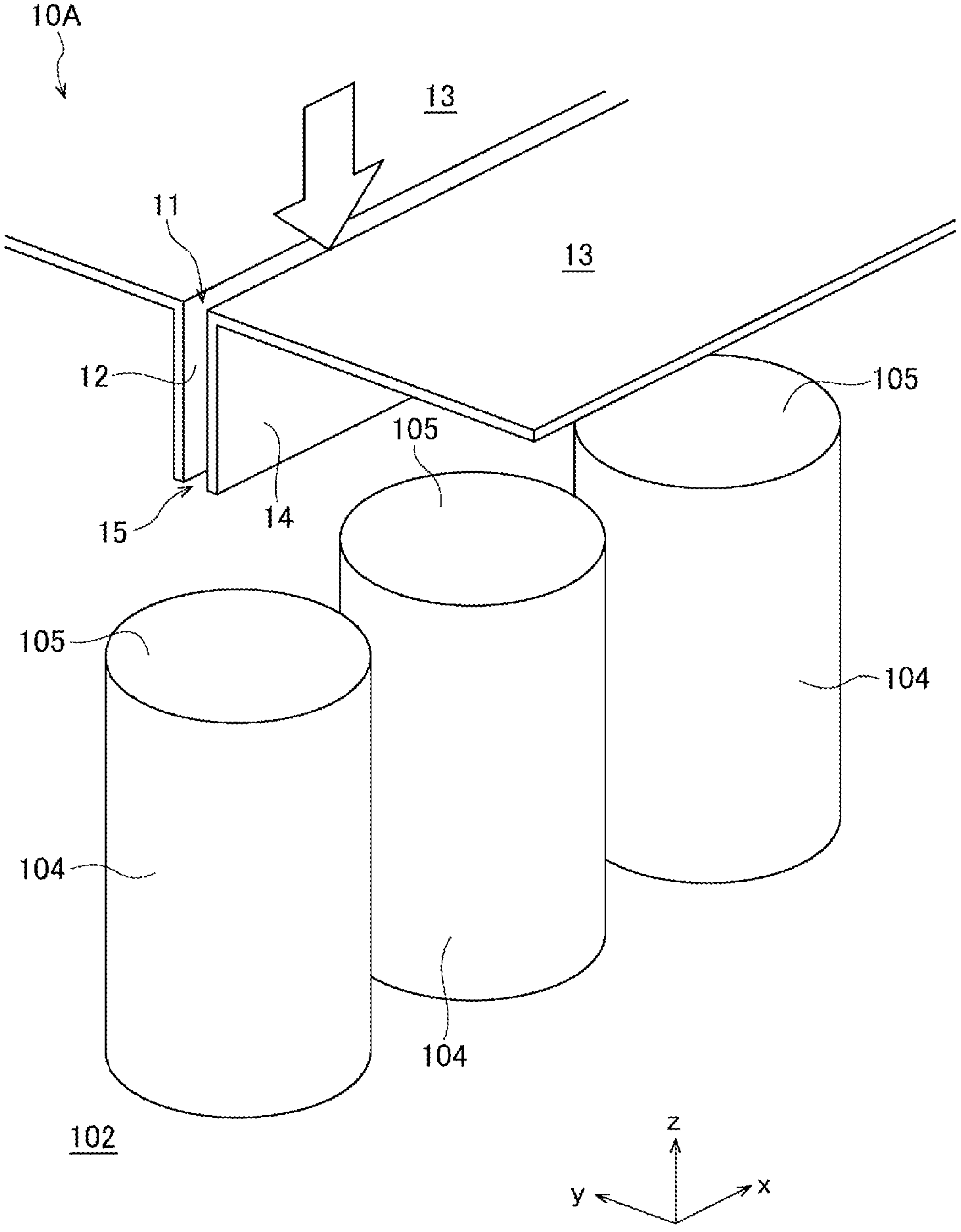
FIG. 16 is a perspective view of a nozzle used for a drying device according to a second embodiment.

Next, a second embodiment will be explained. The same reference signs are given to the same components as those of the first embodiment, and explanation thereof is omitted. As shown in FIG. 16, a nozzle body 10A is provided with nozzles 11. One nozzle 11 is shown in the case of FIG. 16; however, a plurality of nozzles 11 are actually provided in the width direction of the conveyor net 102 at predetermined intervals. Each nozzle 11 has a pair of nozzle walls 12, 14 arranged to face each other at a predetermined interval (for example, 3 to 7 mm). In FIG. 16, the conveying direction corresponds to the x-direction, the width direction of the conveyor net 102 as the conveying unit corresponds to the y-direction, and the direction perpendicular to the surface of the conveyor net corresponds to the z-direction.

The nozzle 11 has a flow path for introducing hot air passing through the punching plate 122 (FIG. 1) to one direction. The flow path has a flat shape formed between the nozzle walls 12, 14. One direction is a discharge direction of hot air. In the case of FIG. 16, one direction is an arrow direction in the drawing (z-direction), which is the direction parallel to a central axis of the bottomed-cylindrical shaped can body 104 normally placed with the upper opening 105 facing upward. A length of one direction of the nozzle 11 can be selected appropriately.

In the embodiment, the nozzle walls 12, 14 are formed by a pair of flat plates arranged at a predetermined interval. The respective nozzle walls 12, 14 are integrated to top boards 13 at base ends. In the nozzle body 10A, the nozzles 11 are formed with the top boards 13 interposed therebetween. The base ends of the nozzle 11 form an entrance of hot air passing through the punching plate 122.

The can bodies 104 area conveyed in a state of being aligned in a line in the conveying direction. The drying device 1 preferably includes an alignment mechanism (not shown) for aligning the can bodies 104 in a line in the conveying direction on an upstream side of the conveyor net 102. Due to the existence of the alignment mechanism, the can bodies 104 conveyed from an upstream process in the drying device 1 in a state of being arranged in a zigzag pattern in plan view can be aligned in a line.

A discharge port 15 as an exit of hot air from which hot air is discharged toward the upper openings 105 of the can bodies 104 is provided at an end of the nozzle 11. The discharge port 15 has a slit-shaped opening. The nozzle 11 is arranged so that a longitudinal direction of the discharge port 15 is a direction parallel to the conveying direction (x-direction), namely, arranged in parallel to the longitudinal direction of the conveyor net 102. A length in a width direction of the discharge port 15 is shorter than a radius of the can body 104. A flow path connecting the entrance of the nozzle 11 and the discharge port 15 has a flat shape when seen from one direction. The area of an opening of the flow path is preferably constant until just before the discharge port 15. In the case of FIG. 16, the flow path and the discharge port 15 seen from one direction have a rectangular shape. Hot air discharged from the nozzle 11 has a predetermined "Re number" which is, for example, approximately 2000 (12 to 16 m/s at the discharge port). As described above, the so-called impinging jet in which the hot air discharged from the nozzles 11 is blown into the can bodies 104 is adopted in drying of cans.

Figure 17:
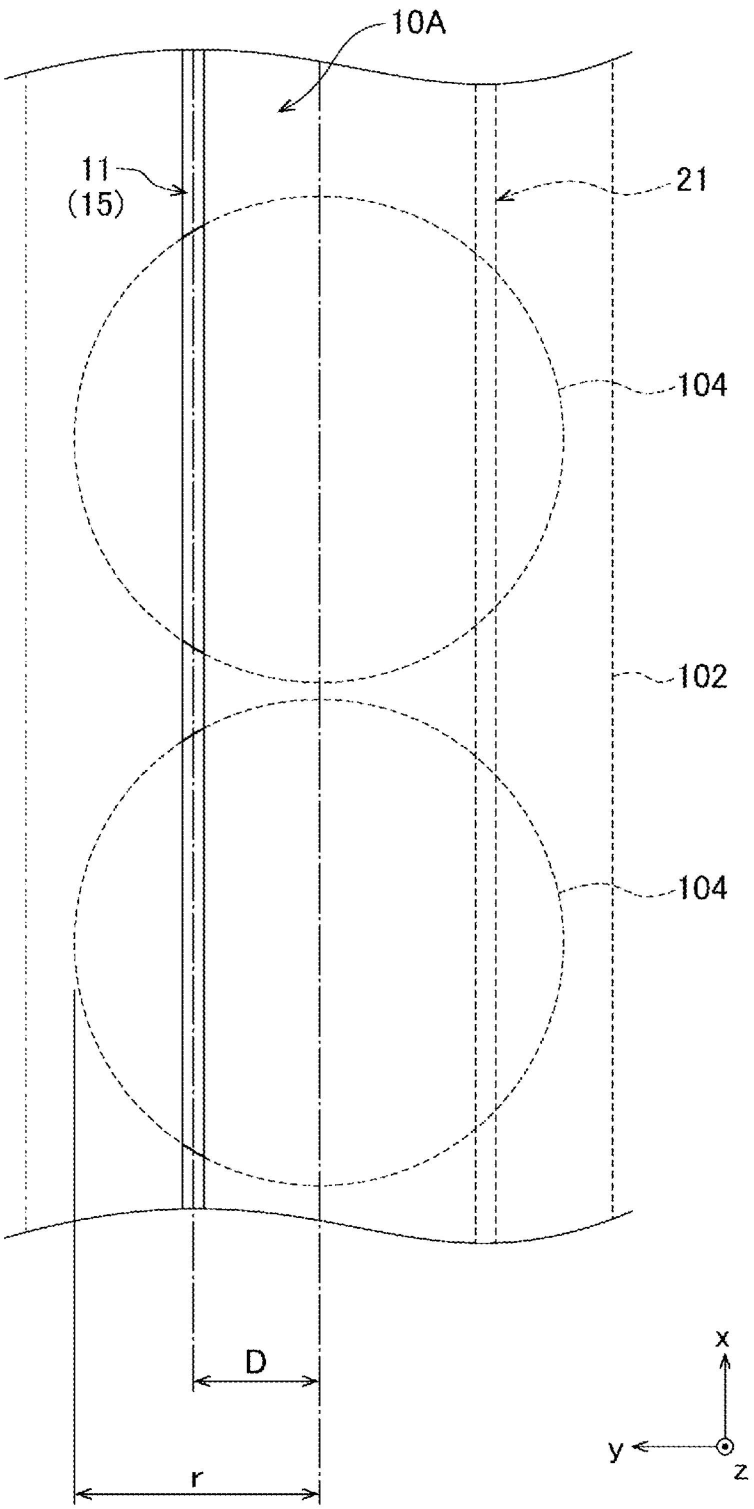
FIG. 17 is a plan view of the nozzle.

As shown in FIG. 17, it is preferable that the discharge port 15 is arranged at a position displaced from a center of the can body 104 to the width direction of the conveyor net 102. The center of the can body 104 indicates the center of a cylindrical shaped can body 104 when seen from the central axis direction. The position of the discharge port 15 can be selected in a range to an intersection point between a straight line in the y-direction passing the center of the can body 104 and a barrel part of the can body, not including the center of the can body 104. In the case of FIG. 17, the discharge port 15 is arranged at a position displaced from the center of the can body 104 to the left side in the width direction (y-direction) of the conveyor net 102.

When a distance between the center in the width direction of the discharge port 15 and the center of the can body 104 is "D", and the radius of the can body 104 is "r", the discharge port 15 is preferably arranged in a range of $(r/3) \leq D \leq (2r/3)$ in the width direction (y-direction) of the conveyor net 102. When the discharge port 15 is arranged in the above range, most of the hot air discharged from the discharge port 15 is fed into the can body 104, then, travels along an inner surface of the barrel part of the can body 104 by later-described Coanda effect and can enter the inside of the can body 104 easily.

The case where the discharge port 15 is arranged at the position displaced from the center of the can body 104 to the left side in the width direction (y-direction) of the conveyor net 102 has been explained in FIG. 17; however, it goes without saying that the discharge port 15 may be displaced to the right side in the width direction (y-direction).

It is preferable that the discharge port 15 is arranged in a range of $(r/3) \leq D < r$. When the discharge port 15 is arranged in the range of $(r/3) \leq D < r$, hot air entering the can body 104 positively travels straight along the inner surface of the barrel part by the later-described Coanda effect; therefore, the entire can body 104 can be heated more uniformly. It is further preferable that the discharge port 15 is arranged in a range of $(3r/5) \leq D < r$.

The drying device 1 may include a suction port 21 on the opposite side of the discharge port 15 across the center of the can body 104. The suction port 21 is connected to the circulation fan through the piping though not shown. The suction port 21 has a slit-shaped opening and arranged so that a longitudinal direction is in parallel to the longitudinal direction of the conveyor net 102 in the same manner as the discharge port 15. A distance between the suction port 21 and the center of the can body 104 may be the same as the above "D" or may be different from the "D", which can be appropriately selected.

Next, the operation and effect of the drying device 1 will be explained. In the drying device 1, the can bodies 104 are conveyed in the state of being aligned in a line in the conveying direction on the conveyor net 102. Plural lines of can bodies 104 are arranged in the width direction of the conveyor net 102, which are arranged in a lattice shape as a whole. Hot air is discharged from the discharge port 15 arranged at an upper predetermined position toward the upper openings 105 of the can bodies 104. Since the discharge port 15 is arranged so that the longitudinal direction is in parallel to the conveying direction, the upper openings 105 of the can bodies 104 are continuously exposed to the hot air; therefore, insides of the can bodies can be dried efficiently.

Figure 18:
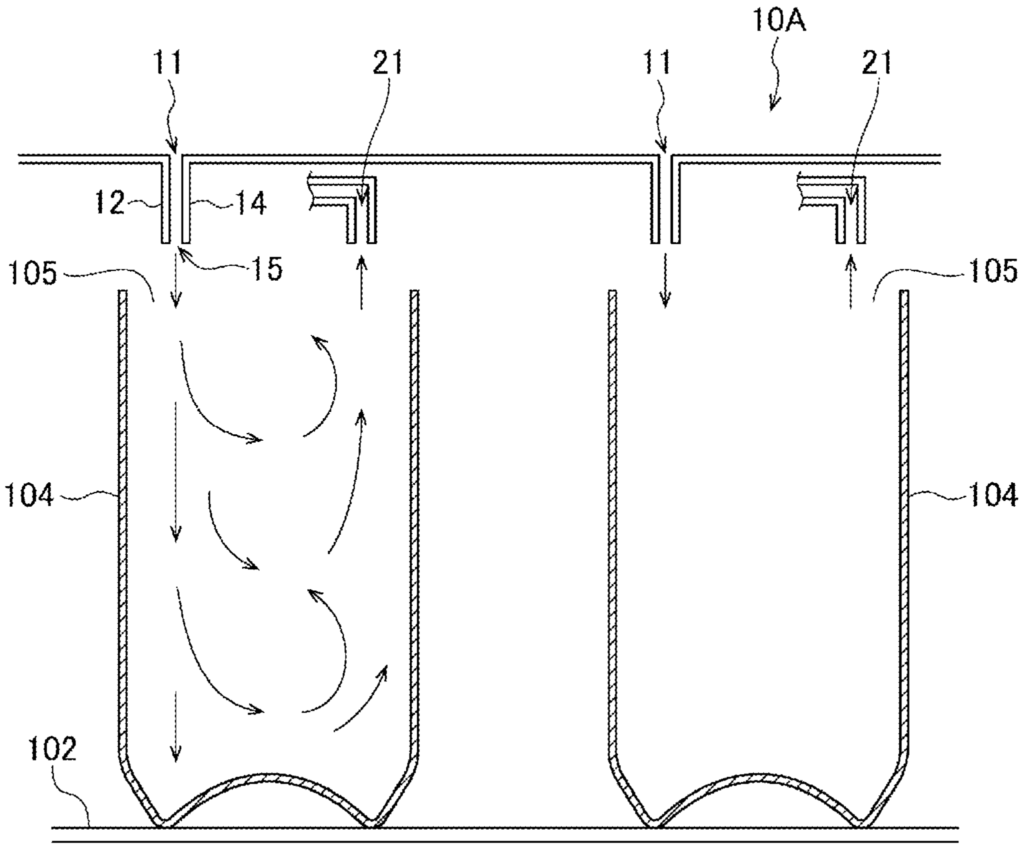
FIG. 18 is a cross-sectional view for explaining the operation of the nozzle.

Since the discharge port 15 is arranged at the position displaced from the center of the can body 104 in the width direction (y-direction) as shown in FIG. 18, hot air discharged from the discharge port 15 can travel straight along the inner surface of the barrel part of the can body 104 and can enter the inside of the can body 104 easily. While part of the hot air entering the inside of the can body 104 becomes a horizontal vortex with an axis parallel to the longitudinal direction of the discharge part 15 and deviates to the central part of the can body 104, the rest reaches the bottom part of the can body along the inner surface of the can body 104 due to Coanda effect. The hot air reaching the bottom part of the can body rises along the inner surface of the barrel part on the opposite side.

The drying device 1 according to the embodiment allows hot air to enter the inside of the can body 104 easily; therefore, the inner surface of the can body 104 can be dried efficiently. When the discharge port 15 is arranged in the range of $(r/3) \leq D \leq (2r/3)$, the hot air discharged from the discharge port 15 is allowed to easily enter the inside of the can body 104 more positively.

The drying device 1 can heat the entire can body 104 more uniformly by arranging the discharge port 15 in the range of $(r/3) \leq D < r$. When the discharge port 15 is arranged in the range of $(3r/5) \leq D < r$, a temperature difference in the can bodies 104 can be further reduced.

The can bodies 104 are conveyed in a state of being aligned in a line in the conveying direction under the discharge port 15 arranged so that the longitudinal direction is in parallel to the conveying direction. A flow rate of hot air entering the can bodies 104 is constant in the drying device 1; therefore, the can bodies 104 are continuously exposed to the hot air, as a result, the can bodies 104 can be dried efficiently.

When the nozzle 11 is arranged as described above, hot air can be continuously supplied to the inside of can body from the upper opening 105 of the can body 104, and the supplied hot air reaches the bottom part along the inner surface of the can body efficiently. Since the can body 104 is heated by contact with hot air, the can body 104 is dried efficiently. The heat transfer coefficient is high particularly when the can body 104 is made of aluminum; therefore, the can body 104 can be dried more efficiently.

In the case of the related-art drying device 100, the longitudinal direction of the discharge port is arranged in parallel to the width direction of the conveyor net; therefore, variations in flow rate of hot air entering the can bodies are large and the upper openings of the can bodies are exposed to hot air intermittently, which is not efficient. In areas where there is no discharge port, heat transfer is basically performed only by natural convection, which creates a so-called smothered state. The can bodies on the conveyor net are actually conveyed in a dense state in which can bodies are arranged in a zigzag shape, not in the lattice shape. Therefore, a fluid resistance is higher in a can group arranged in the zigzag shape than in a can group arranged in the lattice shape. It can be considered that the flow velocity of hot air discharged from the discharge port is rapidly reduced in the vicinity of the upper openings of the can bodies and that the hot air tends to flow to areas where there is no can group. It is necessary to increase the flow velocity while suppressing knocking-over of the can bodies for supplying the hot air to the inner surfaces of the can bodies or between can bodies forcibly, which is not realistic. As the hot air is not supplied to the inner surfaces of the can bodies and between the can bodies, it is difficult to heat the can bodies efficiently, and the temperature difference between an upper part and a lower part of the can body is increased. As a result, the can bodies become in a state where ununiform baking of the coating material and a residual of a solvent on inner sides are not sufficiently suppressed. Accordingly, it has been necessary to make a drying period longer by reducing a conveying speed or extending equipment in the past.

On the other hand, gaps between the can bodies 104 are expanded by arranging the can bodies 104 in the lattice shape in the entrance of the drying device 1 in the embodiment. Hot air discharged from the discharge port 15 arranged so that the longitudinal direction is in parallel to the conveying direction flows into the gaps between the can bodies 104, and into the insides of the can bodies 104, respectively. The hot air flows into the gaps easily because the gaps between the can bodies 104 are wide. The can bodies 104 can obtain an effect of forced convection heat transfer from outer surfaces by the hot air.

In the hot air flowing into the can bodies 104, Coanda effect tends to occur inside the can bodies 104 because the discharge port 15 is arranged at the position displaced from the center of the can body 104 in the width direction (y-direction). The above hot air becomes a so-called wall jet due to Coanda effect. Since the diffusion is suppressed in the wall jet as compared with a free jet, the flow velocity is not easily reduced and a central velocity of the jet is maintained. Therefore, the wall jet inside the can body 104 forms a flow reaching the can bottom and blowing up to an upper part of the can. In the baking process of the coating material on the inner surface of the can body 104, evaporation and volatilization of water and solvents occur with the cross-linking reaction of the coating material. The above wall jet suppresses stagnation of the solvent inside the can body 104 and makes the solvent mass-transferred efficiently. The wall jet reaching the can bottom is blown up to the upper part of the can with the solvent; therefore, mass transfer can be further promoted by collecting the jet.

A conveyance amount of the can bodies 104 per an hour is reduced as compared with the related-art device by arranging the can bodies 104 in the lattice shape. However, the drying device 1 according to the embodiment can perform processing without reducing the conveyance amount of the can bodies 104 per an hour by increasing the conveying speed of the conveyor net as the heat transfer coefficient and mass-transfer efficiency are improved. As described above, it is possible to improve the quality of the coating film of the can bodies 104 and to realize energy saving by improving the heat transfer coefficient and mass-transfer efficiency according to the embodiment.

Figure 19:
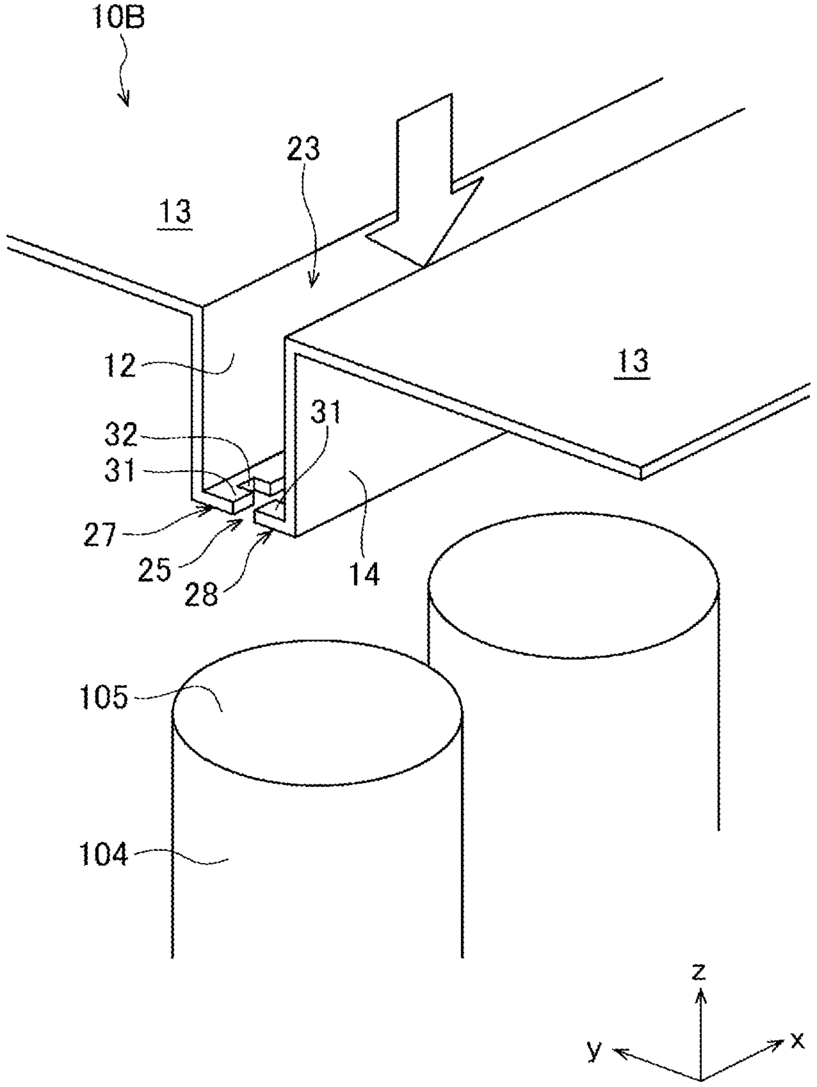
FIG. 19 is a perspective view showing a modification example of the nozzle.

The case where the flow path and the discharge port 15 have the rectangular shape when seen from one direction has been explained in the above embodiment; however, the present invention is not limited to this. A nozzle body 10B shown in FIG. 19 is provided with a nozzle 23. The nozzle 23 has a plurality of protrusions 31 protruding toward the facing nozzle walls 12, 14 at tip end sides of the nozzle walls 12, 14, which are, tip ends 27, 28 in the case of FIG. 19. The plural protrusions 31 have a comb-teeth shape, which are formed along the longitudinal direction of the discharge port 15. The protrusion 31 shown in FIG. 19 has a rectangular shape when seen from one direction. Recesses 32 are formed between respective protrusions 31. The recesses 32 have a rectangular shape like the protrusions 31.

Hot air passing through the above nozzle 23 passes the recess 32 between the protrusions 31 and becomes a vertical vortex having an axis of one direction, thereby increasing rectilinearity. Since a discharge port 25 according to the modification example is arranged so that the longitudinal direction of the discharge port 25 is in parallel to the conveying direction, hot air can be continuously supplied to the upper openings 105 of the can bodies 104, which allows the insides of the can bodies 104 to be dried efficiently.

When the discharge port 25 is arranged at a position displaced from the center of the can body 104 in the width direction (y-direction), the same effects as the above embodiment can be obtained. The drying device 1 including the nozzle 23 can discharge hot air with improved rectilinearity from the discharge port 25 as the nozzle 23 has protrusions 31; therefore, the inside of the can body 104 can be dried more efficiently. The nozzle 23 is provided with the protrusions 31 and vertical vortexes are forcibly generated, thereby suppressing generation of a large-scaled vortex street of the free jet. The hot air passing through the nozzle 23 can extend the region where the flow velocity is maintained at the discharge port (velocity potential core) as compared with hot air passing through the nozzle not having protrusions, and an effect equivalent to the increase in the Reynolds number can be obtained. The protrusions 31 are not limited to a case of the rectangular shape, but may have a triangular shape.

In the case of FIG. 19, the protrusions 31 and the recesses 32 formed on the nozzle wall 12 are formed at the same positions as positions of the protrusions 31 and the recesses 32 formed in the nozzle wall 14; however, the present invention is not limited to this. For example, the protrusions 31 and the recesses 32 formed in the nozzle wall 12 may be displaced with respect to the protrusions 31 and the recesses 32 formed in the nozzle wall 14 in the longitudinal direction of the discharge port 15, or the recesses 32 may be formed in the nozzle wall 14 at positions corresponding to the protrusions 31 formed in the nozzle wall 12.

The case where the plural protrusions 31 are provided at the tip ends 27, 28 of the nozzle walls 12, 14 in FIG. 19 has been explained; however, the present invention is not limited to this. The protrusions 31 may be formed at positions displaced to the entrance direction of the discharge port 25 to the extent that the rectilinearity of hot air is not significantly reduced due to pressure loss.

The case where the drying device 1 has the alignment mechanism (not shown) for aligning the can bodies 104 in a line in the conveying direction on the upstream side of the conveyor net 102 has been explained in the above embodiment; however, the present invention is not limited to this. The alignment mechanism may be provided on the upstream side of the drying device 1 separately from the drying device 1.

EXAMPLE 2

Figure 20:
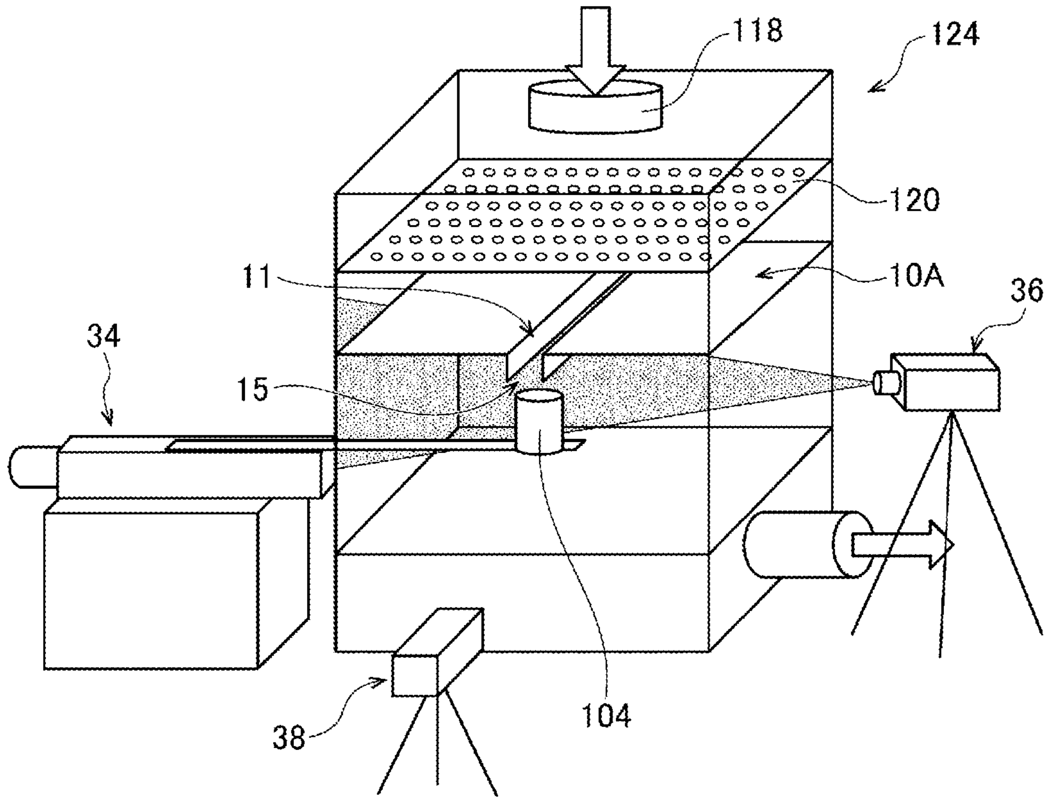
FIG. 20 is a perspective view schematically showing a structure of an experimental device.

Results obtained by actually verifying effectiveness in arrangement of the discharge port according to the embodiment will be explained below. First, an experimental device 124 according to FIG. 20 was prepared. In the experimental device 124, a gas is discharged to the can body 104 through the upper blow-out nozzle 118, the punching plate 120, and the nozzle body 10A. The Reynolds number of the gas was set to 2000 and a flow velocity was set to 6 m/s at the discharge port 15. The can body 104 was held so as to move in a direction orthogonal to the longitudinal direction of the discharge port 15 by a linear guide 34. A moving speed of the can body 104 was set to 2.40 cm/s.

Flows of the discharged gas were imaged by particle image velocimetry. Specifically, flows of the gas discharged from the nozzle 11 were imaged by using a CCD camera 36. The oil mist (average particle diameter 1 μm, specific gravity s≈1.05) was used as a tracer. A light source 38 was an Nd: YAG laser (the maximum output 200 mJ), and a laser sheet was emitted from a position in FIG. 20.

Figure 21:
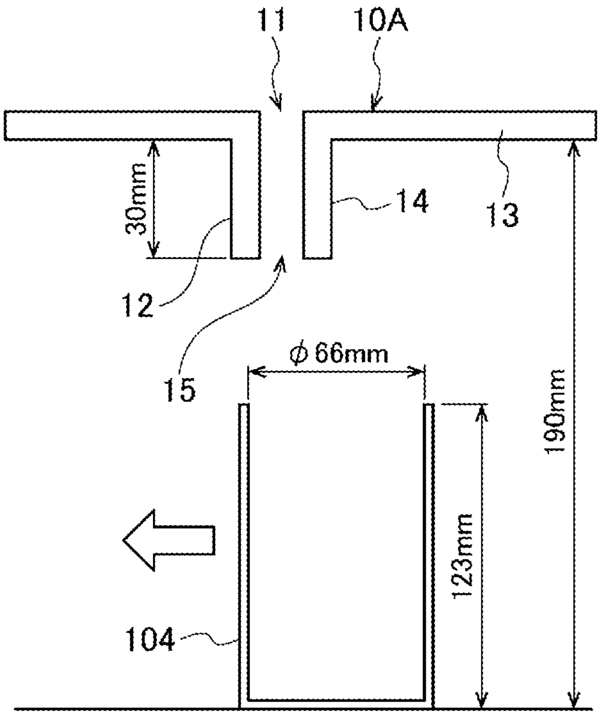
FIG. 21 is a partially enlarged view of the experimental device.

As the can body 104 (FIG. 21), a bottomed cylindrical body with a diameter of 66 mm and a height 123 mm having an upper opening and formed of a transparent resin was used. In the nozzle 11, a length in one direction was 30 mm and a length in the width direction of the discharge port 15 was 5 mm. A distance between a pedestal on which the can body was placed and the top board 13 was 190 mm. Results obtained by imaging flows of the gas discharged from the nozzle 11 by using the CCD camera 36 are shown in FIGS. 22A to 22D. FIGS. 23A to 23D are plan views showing positions of the can body 104 and the discharge port 15 corresponding to respective views of FIGS. 22A to 22D.

Figure 22D:
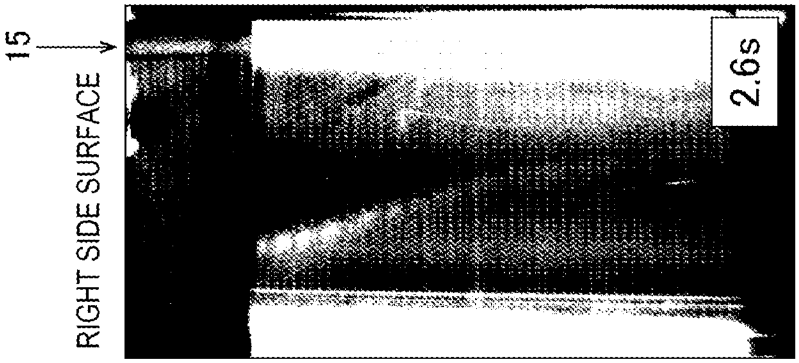

Elapsed times from a time point in which a left-side barrel part of the can body 104 corresponds to the discharge port are shown in the lower right of respective images. As shown in FIGS. 22A, 22D, the gas discharged from the discharge port 15 travels straight in one direction and enters the inside of the can body along the inner surface of the barrel part of the can body due to Coanda effect in the vicinity of the barrel part of the can body.

Figure 22C:
Figure 22B:
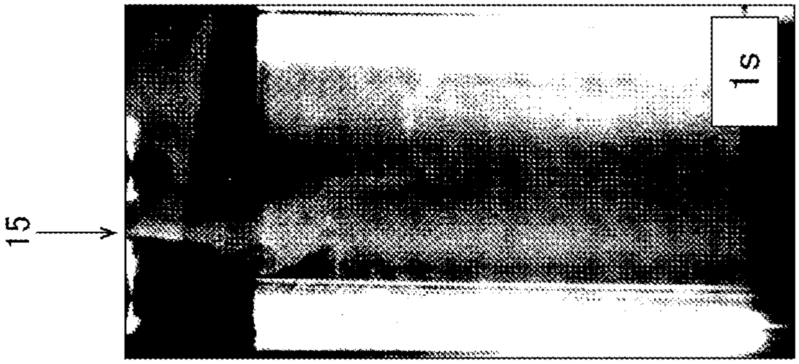
Figure 22A:
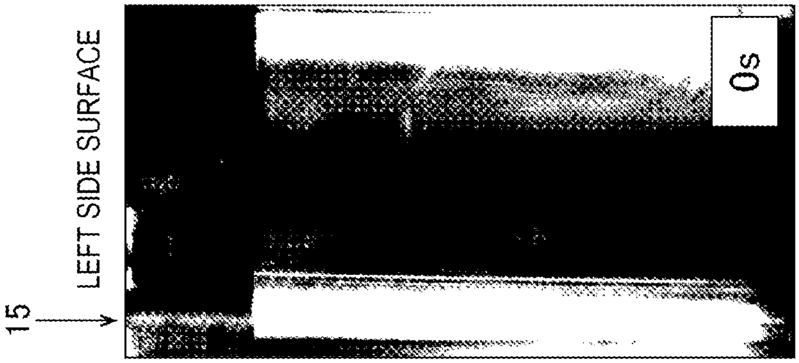
Figure 23D:
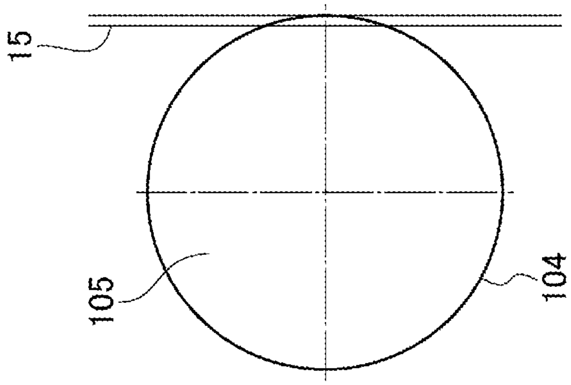
Figure 23C:
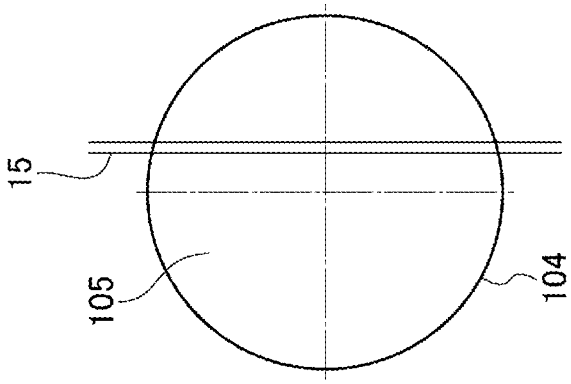
Figure 23B:
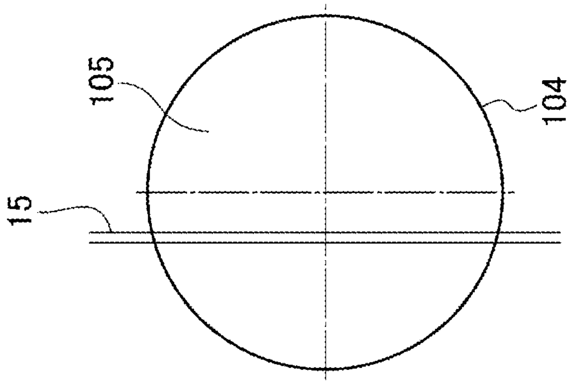
Figure 23A:
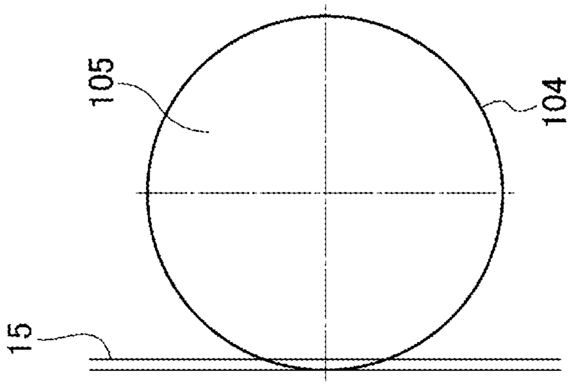

As shown in FIGS. 22B, 22C, it was confirmed that the gas discharged from the discharge port 15 entered the inside of the can body while traveling to the barrel part of the can body due to Coanda effect at positions where the distance D between the discharge port 15 and the center of the can body 104 was 9 mm (FIG. 22B) and 7.8 mm (FIG. 22C). As shown in FIGS. 23B, 23C, overlapping areas between the discharge port 15 and the upper opening 105 are large, and most of the gas discharged from the discharge port 15 can be fed into the can body, which is efficient.

According to the above results, the gas discharged from the discharge port 15 enters the inside of the can body from the upper opening 105 while traveling toward the barrel part of the can body at least at a position where the discharge port 15 is in a range of $(r/3) \leq D$. As it is necessary to increase the overlapping area between the discharge port 15 and the upper opening to a proper degree for feeding hot air discharged from the discharge port 15 into the inside of the can body efficiently, $D \leq (2r/3)$ is preferable.

EXAMPLE 3

Results obtained by actually verifying the relation between arrangement of the discharge port according to the embodiment and the heating temperature of the can body will be explained below. A heat gun (manufactured by ISHIZAKI ELECTRIC MFG. CO., LTD, SURE Plajet PJ-214A) was used as a jet source. The nozzle was arranged at a position approximately 20 mm above an upper end of the can body with respect to the can body with a height of 135 mm and an inner diameter of approximately 50 mm. A flat nozzle having a discharge port with an opening width of 3 mm and a length of approximately 50 mm was used. Hot air with a wind velocity of approximately 15 m/s, a temperature of approximately 300° C., and a Reynolds number of approximately 1400 was discharged from the nozzle.

Temperatures at a position of 8 mm from the bottom surface of the can body (bottom), a position of 68 mm from the bottom surface (middle), and a position of 127 mm from the bottom surface (top) were measured while changing the distance D from the center of the can body to the center of the discharge port. The temperatures were measured at respective points of “a”, “b”, “c” when the can body was seen from the central axis direction. The point “a” is one intersection point between a straight line passing the center of the can body and orthogonal to the longitudinal direction of the nozzle and the barrel part of the can body. The point “c” is the other intersection point on the barrel part of the can body facing the point “a” across the center of the can body. The point “b” is one intersection point between a straight line passing the center of the can body and parallel to the longitudinal direction of the nozzle and the barrel part of the can body.

Figure 24:
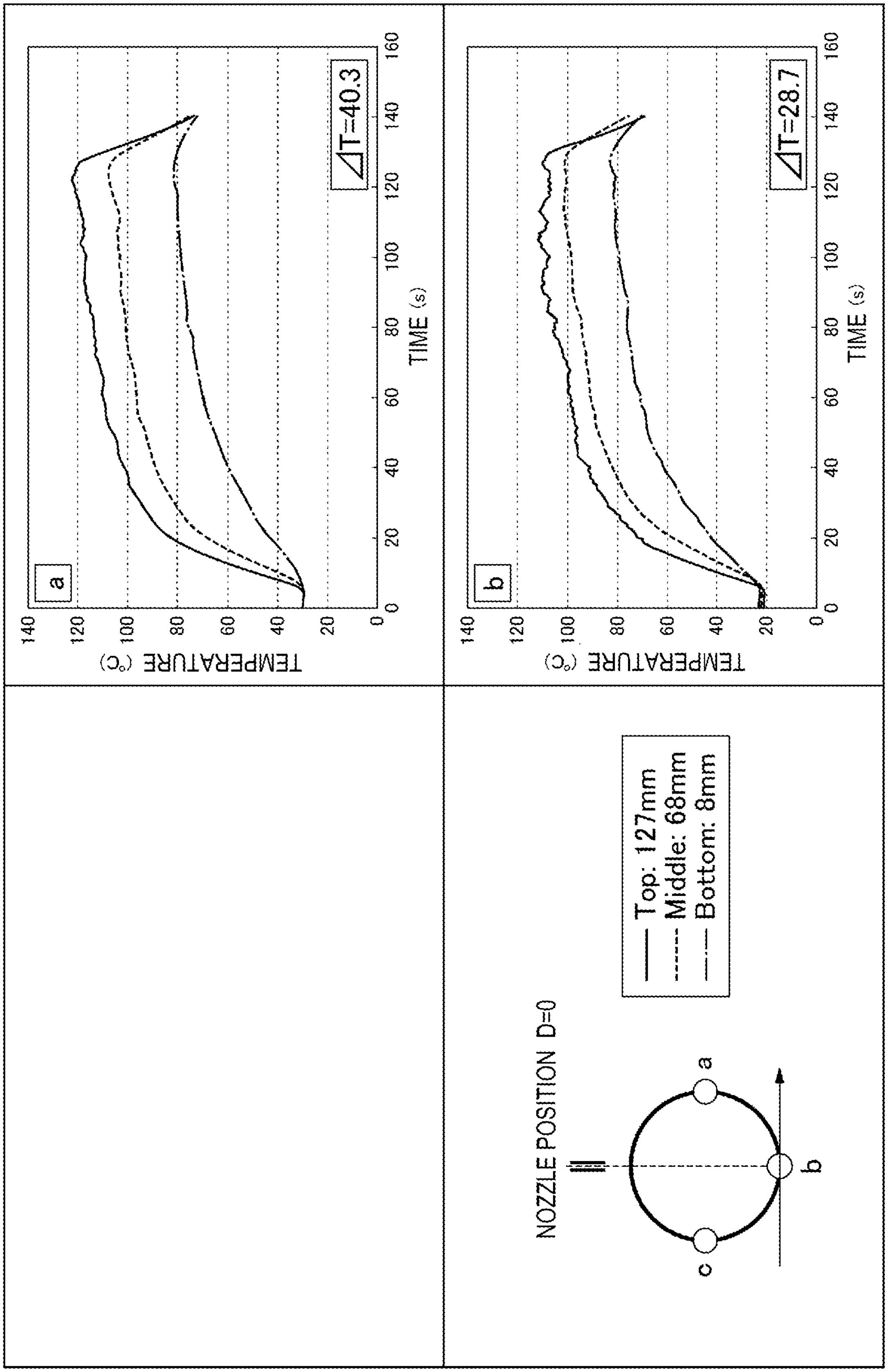
FIG. 24 shows graphs indicating temperature profiles of the can body when the nozzle position is D=0.
Figure 26:
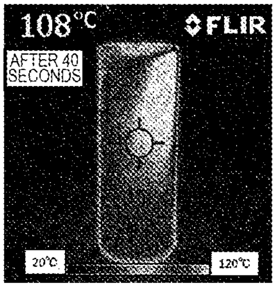
FIG. 26 shows contour views indicating temperatures and velocities.
Figure 26:
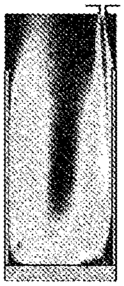
Figure 26:
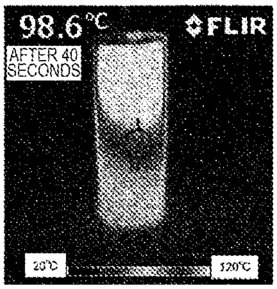
Figure 26:
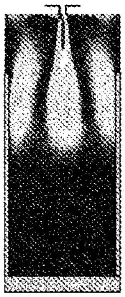

FIG. 24 shows results obtained when the discharge port was arranged at a position where the distance D was 0 (zero) (a central position of the can body). In graphs, the horizontal axis represents time (s), the vertical axis represents temperature (° C.), curves represent profiles of measured temperatures at the bottom, the middle, and the top, respectively. It was confirmed that the temperature of the bottom was the lowest at both of the point “a” (=c) and the point “b”, and a temperature difference between the top and the bottom at the point “a” obtained after 120 seconds from the start of discharging the hot air was 40.3° C. FIG. 26 shows contour views showing temperatures and velocities obtained after 40 seconds from the start of discharging hot air. A temperature contour view obtained when the distance D (nozzle position) is 0 (zero) shows that the highest temperature is at the top of the can body, the second highest is at the middle, and the lowest temperature is at the bottom. As recognized from a velocity contour view, it is found that the velocity of hot air discharged from the nozzle is rapidly reduced at the middle of the can body. These results match the results of FIG. 24, and it can be considered that the temperature difference between the bottom and the top becomes large when the discharge port is at the central position of the can body because hot air discharged from the discharge port does not reach the bottom part of the can body.

Figure 25:
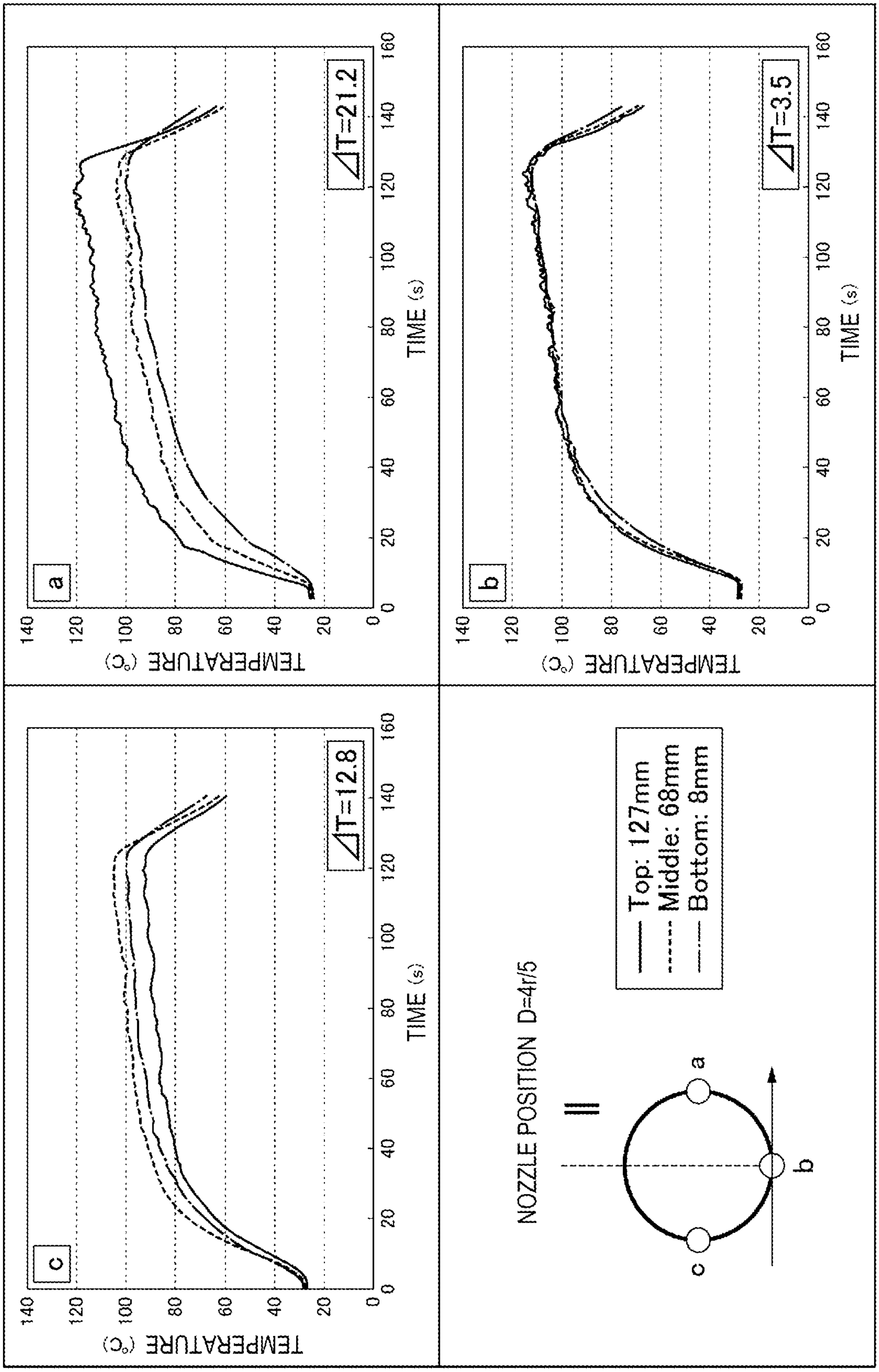
FIG. 25 shows graphs indicating temperature profiles of the can body when the nozzle position is D=(4r/5)

FIG. 25 shows results obtained when the discharge port was arranged at a position where the distance D is 4r/5 (=0.8r). In respective graphs, the horizontal axis represents time (s), the vertical axis represents temperature (° C.), curves represent profiles of measured temperatures at the bottom, the middle, and the top, respectively. The temperature of the top was the highest at the point “a” where the discharge port was the closest, a temperature difference obtained after 120 seconds from the start of discharging the hot air was small, that was 3.5° C., at the point “b”, and the temperatures of the middle and the bottom were higher than the temperature of the top at the point “c” where the discharge port was the farthest. As apparent from a temperature contour view of FIG. 26, it is found that the temperatures are high over the entire parts of the top, the bottom, and the middle when the distance D is 4r/5. As can be recognized from the velocity contour view, hot air discharged from the discharged port enters the inside of the can body along the inner surface of the barrel part of the can body, turning back at the bottom part and rising up along the inner surface of the barrel part of the can body on the opposite side. The results match the results of FIG. 25, and it can be considered that hot air discharged from the discharge port is allowed to reach the bottom part of the can body by arranging the discharge port at the position displaced from the center of the can body and that the temperature difference between the bottom and the top is reduced.

Figure 27:
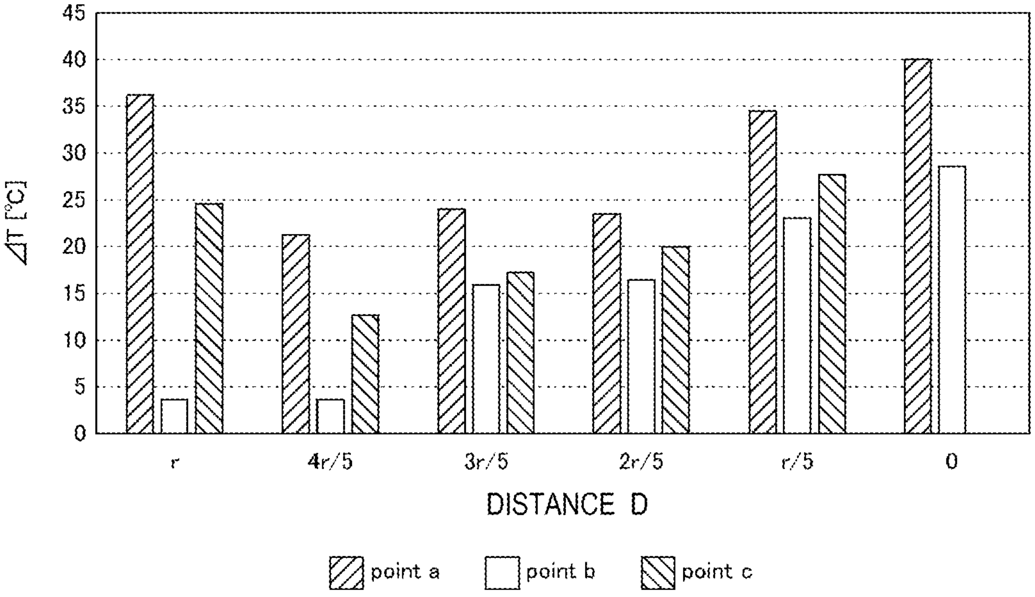
FIG. 27 is a graph showing the relation between the position of the nozzle and the temperature difference of the can body.

FIG. 27 shows the relation between the distance D from the center of the can body to the can body and the temperature difference in the bottom, the middle, and the top at respective points. It has been confirmed, from FIG. 27, that the temperature difference was the largest when the discharge port was arranged at the center of the can body (distance D=0). It has been found that the temperature difference was reduced as the discharge port was becoming displaced from the center of the can body, and became the smallest when the distance D was 4r/5 (=0.8r).

REFERENCE SIGNS LIST

1: driving device
10: nozzle body
11: nozzle
12, 14: nozzle wall
15: discharge port
20: protrusion
21: suction port
22: recess (gap)
23: nozzle
25: discharge port
31: protrusion
100: drying device

The invention claimed is:

1. A nozzle comprising:
a pair of nozzle walls that constitute one nozzle wall and another nozzle wall, and are arranged to face each other at a predetermined interval; and
a slit-shaped discharge port provided at tip ends of the pair of nozzle walls, wherein
the one nozzle wall has a plurality of protrusions provided at a tip end side thereof, said protrusions protruding toward the other nozzle wall,
the other nozzle wall has a plurality of other protrusions provided at a tip end side thereof, said other protrusions protruding toward the one nozzle wall,
a Reynolds number of a gas discharged from the discharge port is 1000 to 10000, and
a ratio of an area of the protrusion to an area of a gap between the protrusions is 1:3 to 2:1.

2. A nozzle comprising:
a pair of nozzle walls that constitute one nozzle wall and another nozzle wall, and are arranged to face each other at a predetermined interval; and
a slit-shaped discharge port provided at tip ends of the pair of nozzle walls, wherein
the one nozzle wall has a plurality of protrusions provided at a tip end side thereof, said protrusions protruding toward the other nozzle wall,
the other nozzle wall has a plurality of other protrusions provided at a tip end side thereof, said other protrusions protruding toward the one nozzle wall, and
a Reynolds number of a gas discharged from the discharge port is 1000 to 4000.

3. The nozzle according to claim 1,
wherein the protrusions have a rectangular shape when seen from a discharge direction.

4. The nozzle according to claim 1,
wherein the protrusions have a triangular shape when seen from a discharge direction.

5. A drying device comprising:

a plurality of areas with different drying temperatures; and a conveying unit conveying can bodies formed in a bottomed cylindrical shape to the plural areas, wherein each of plural areas includes a nozzle comprising:

a pair of nozzle walls that constitute one nozzle wall and another nozzle wall, and are arranged to face each other at a predetermined interval; and a slit-shaped discharge port provided at tip ends of the pair of nozzle walls, and wherein the one nozzle wall has a plurality of protrusions provided at a tip end side thereof, said protrusions protruding toward the other nozzle wall, and wherein the other nozzle wall has a plurality of other protrusions provided at a tip end side thereof, said other protrusions protruding toward the one nozzle wall.

6. The drying device according to claim 5, wherein at least one of a shape of a protrusion and a ratio of an area of the protrusion to an area of a gap between the protrusions differs in the plural areas.

7. The drying device according to claim 5, wherein, in the plural areas, a preheating zone, a temperature increasing zone, and a holding zone are sequentially provided along a conveying direction from an upstream side, the protrusions in the preheating zone have a rectangular shape when seen from a discharge direction, and the ratio of the area of the protrusion to the area of the gap between the protrusions is 1:2, and the protrusions in the temperature increasing zone and the holding zone have a triangular shape when seen from the discharge direction, and the ratio of the area of the protrusion to the area of the gap between the protrusions is 1:3.

8. The drying device according to claim 5, wherein a width length of the discharge port is shorter than a radius of the can body.

9. A method of producing a can body comprising the steps of:

conveying bottomed-cylindrical shaped can bodies in which a coating film made of a thermosetting resin coating material is formed on inner surfaces to a plurality of areas with different drying temperatures; and baking the coating film on the inner surfaces, wherein, in the step of baking the coating film, a gas is discharged from a nozzle according to claim 1.

10. A drying device comprising:

a conveying unit conveying can bodies formed in a bottomed cylindrical shape; and a nozzle according to claim 1, wherein a longitudinal direction of the discharge port is parallel to a conveying direction.

11. The drying device according to claim 10, wherein the discharge port is arranged at a position displaced from a center of the can body in a width direction of the conveying unit.

12. The drying device according to claim 10, wherein, when a distance between a center in a width direction of the discharge port and a center of the can body is "D", and a radius of the can body is "r", the discharge port is arranged within a range of $(r/3) \leq D \leq r$.

13. The drying device according to claim 11, wherein a suction port from which the gas is sucked is provided on an opposite side of a side where the discharge port is arranged across the center of the can body.

14. The drying device according to claim 10, wherein the conveying unit has an alignment mechanism aligning the can bodies in a line in the conveying direction.

* * * * *